(12) United States Patent
Choi et al.

(10) Patent No.: US 12,431,124 B2
(45) Date of Patent: Sep. 30, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Sungja Choi, Suwon-si (KR); Jonghyun Kim, Suwon-si (KR); Yubin Seo, Suwon-si (KR); Eunji Lee, Suwon-si (KR); Haejun Lee, Suwon-si (KR); Yongjin Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 418 days.

(21) Appl. No.: 17/943,585

(22) Filed: Sep. 13, 2022

(65) Prior Publication Data

US 2023/0197062 A1 Jun. 22, 2023

(30) Foreign Application Priority Data

Dec. 21, 2021 (KR) .................. 10-2021-0184280

(51) Int. Cl.
*G10L 15/07* (2013.01)
*G06F 21/62* (2013.01)
*G06F 40/20* (2020.01)
*G10L 15/18* (2013.01)
*G10L 15/183* (2013.01)
(Continued)

(52) U.S. Cl.
CPC .......... *G10L 15/07* (2013.01); *G06F 21/6245* (2013.01); *G06F 40/20* (2020.01); *G10L 15/18* (2013.01); *G10L 15/183* (2013.01); *G10L 15/22* (2013.01); *G10L 15/30* (2013.01)

(58) Field of Classification Search
CPC ....... G10L 15/07; G10L 15/18; G10L 15/183; G10L 15/22; G10L 15/30; G06F 21/6245; G06F 40/20
USPC ..................................... 704/243
See application file for complete search history.

(56) References Cited

U.S. PATENT DOCUMENTS

| | | | | |
|---|---|---|---|---|
| 9,390,716 B2* | 7/2016 | Nakano | ............ | G10L 15/08 |
| 9,858,925 B2* | 1/2018 | Gruber | ............ | G10L 15/18 |
| 11,133,007 B2* | 9/2021 | Choi | ............ | G01C 21/3608 |

(Continued)

FOREIGN PATENT DOCUMENTS

| | | | | |
|---|---|---|---|---|
| CN | 113472806 A | * | 10/2021 | ......... H04L 63/0428 |
| CN | 116648745 A | * | 8/2023 | ............. G10L 15/22 |

(Continued)

*Primary Examiner* — Edwin S Leland, III
(74) *Attorney, Agent, or Firm* — Sughrue Mion, PLLC

(57) ABSTRACT

An electronic apparatus includes a memory configured to store personal data associated with a user, a communication interface configured to communicate with a server, and a processor configured to obtain, from the personal data associated with the user stored in the memory and based on a user speech being received, personal data corresponding to the user speech, identify, from the personal data corresponding to the user speech, first sub data corresponding to a private attribute and second sub data corresponding to a public attribute, obtain combination information based on the user speech and the second sub data, transmit, through the communication interface, the combination information to the server, and obtain response information corresponding to the combination information from the server.

11 Claims, 24 Drawing Sheets

(51) Int. Cl.
*G10L 15/22* (2006.01)
*G10L 15/30* (2013.01)

(56) References Cited

U.S. PATENT DOCUMENTS

| | | | | |
|---|---|---|---|---|
| 2011/0010174 | A1* | 1/2011 | Longe | G10L 15/32 |
| | | | | 704/235 |
| 2014/0207442 | A1* | 7/2014 | Ganong, III | H04W 12/02 |
| | | | | 704/201 |
| 2021/0021910 | A1* | 1/2021 | Tsuru | H04N 21/84 |
| 2021/0240437 | A1* | 8/2021 | Maury | G06F 3/167 |
| 2021/0304756 | A1* | 9/2021 | Iwase | G10L 15/22 |
| 2023/0169195 | A1* | 6/2023 | Shah | G06F 21/6245 |
| | | | | 726/30 |
| 2023/0197062 | A1* | 6/2023 | Choi | G06F 21/6245 |
| | | | | 704/243 |

FOREIGN PATENT DOCUMENTS

| | | | | | |
|---|---|---|---|---|---|
| CN | 108665890 | B | * | 10/2023 | ............ G10L 15/22 |
| KR | 20200052954 | A | * | 5/2020 | ............ H04W 76/14 |
| KR | 10-2020-0129922 | A | | 11/2020 | |
| WO | WO-2015005679 | A1 | * | 1/2015 | ............ G10L 15/30 |
| WO | WO-2021248011 | A1 | * | 12/2021 | ............ G06F 3/167 |

\* cited by examiner

FIG. 1
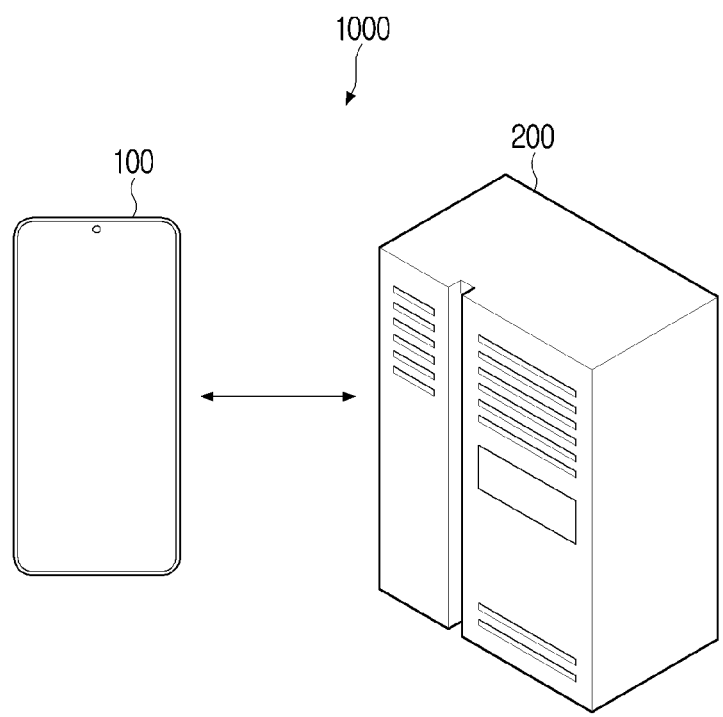

FIG. 17

| GROUP | CRITERION |
|---|---|
| FIRST GROUP (WEEKDAY LUNCH) | MON-FRI 11:00~15:00 |
| SECOND GROUP (WEEKDAY DINNER) | MON-FRI 17:00~21:00 |
| THIRD GROUP (WEEKEND LUNCH) | SAT-SUN 11:00~15:00 |
| FOURTH GROUP (WEEKEND DINNER) | SAT-SUN 17:00~21:00 |

~1710

| GROUP | CRITERION |
|---|---|
| FIRST GROUP (INDIVIDUAL) | 1 PERSON |
| SECOND GROUP (SMALL SCALE) | 2 PERSONS TO 4 PERSONS |
| THIRD GROUP (GROUP) | 5 PERSONS OR MORE |

~1720

| GROUP | CRITERION |
|---|---|
| FIRST GROUP (SMALL AMOUNT) | LESS THAN KRW 100,000 |
| SECOND GROUP (MEDIUM AMOUNT) | GREATER THAN OR EQUAL TO KRW 100,000 AND LESS THAN KRW 400,000 |
| THIRD GROUP (HIGH AMOUNT) | GREATER THAN OR EQUAL TO KRW 400,000 |

~1730

ELECTRONIC APPARATUS AND CONTROLLING METHOD THEREOF

CROSS-REFERENCE TO RELATED APPLICATION

This application is based on and claims priority to Korean Patent Application No. 10-2021-0184280, filed on Dec. 21, 2021, in the Korean Intellectual Property Office, the disclosure of which is incorporated herein by reference in its entirety.

BACKGROUND

1. Field

The disclosure relates generally to an electronic apparatus and a controlling method thereof, and more particularly to an electronic apparatus which provides a processing result of a natural language by using personal information and a controlling method thereof.

2. Description of Related Art

A natural language processing model may refer to a model which analyzes and processes a natural language of a person. The natural language processing model may obtain the natural language as input data, and obtain a natural language processing result as output data. A performance of the natural language processing module may be enhanced based on an accuracy of the natural language processing result being higher. To enhance the performance of the natural language processing model, personal information may be used. Specifically, the natural language processing model may additionally use the personal information in addition to the natural language which is input data.

The natural language processing model which uses the personal information may show enhanced dialog comprehension performance. In the personal information of a user, a point of interest of the user may be present. For example, the personal information of the user may include words frequently used by the user, places frequently visited by the user, or the like.

Accordingly, when natural language having an unclear or ambiguous meaning is received, the natural language processing model may clearly determine a meaning of the natural language by additionally taking into consideration the personal information.

However, there is a risk of the personal information being exposed when the natural language processing model uses personal information. In general, the personal information may include sensitive information of the user. Accordingly, there is a risk of the personal information being leaked in a process in which the personal information is transmitted to an external device or the personal information is stored in the external device.

SUMMARY

Provided are an electronic apparatus which transmits the personal data of which a portion of data is excluded to a natural language processing model and a controlling method thereof.

Additional aspects will be set forth in part in the description which follows and, in part, will be apparent from the description, or may be learned by practice of the presented embodiments.

According to an aspect of the disclosure, an electronic apparatus may include a memory configured to store personal data associated with a user, a communication interface configured to communicate with a server, and a processor configured to obtain, from the personal data associated with the user stored in the memory and based on a user speech being received, personal data corresponding to the user speech, identify, from the personal data corresponding to the user speech, first sub data corresponding to a private attribute and second sub data corresponding to a public attribute, obtain combination information based on the user speech and the second sub data, transmit, through the communication interface, the combination information to the server, and obtain response information corresponding to the combination information from the server.

The processor may be further configured to identify a plurality of sub words based on the user speech, where the personal data corresponding to the user speech is obtained based on the identified plurality of sub words.

The private attribute may include an attribute set by the user so as to be not transmitted to the server.

The processor may be further configured to output, based on essential information not being included in the combination information, first guide information to input the essential information.

The processor may be further configured to obtain normalization data by normalizing the first sub data with a predetermined function, where the combination information is further obtained based on the normalization data.

The processor may be further configured to identify, based on a number being included in the first sub data, a group corresponding to the first sub data from among a predetermined plurality of groups, and obtain the identified group as the normalization data.

The processor may be further configured to identify, based on a name being included in the first sub data, a number of persons based on the name included in the first sub data, and obtain the number of persons as the normalization data.

The processor may be further configured to, based on the first sub data corresponding to the private attribute being identified, checking whether to transmit the first sub data by outputting second guide information, and obtain the combination information based on a user input indicating that the first sub data is not to be transmitted to the server being received through the second guide information.

The processor may be further configured to, based on the first sub data corresponding to the private attribute being identified from among the personal data, change a portion of a text corresponding to the first sub data to a predetermined symbol, and output the second guide information including the changed portion of the text corresponding to the first sub data.

The electronic apparatus may include a microphone and a display, and the processor may be further configured to obtain the user speech from the microphone, based on the combination information being obtained, control the display to display the combination information, and based on the response information being obtained, control the display to display the response information.

According to an aspect of the disclosure, a controlling method of an electronic apparatus configured to store personal data associated with a user and to communicate with a server may include obtaining, from the personal data associated with the user and based on a user speech being received, personal data corresponding to the user speech, identifying, from the personal data corresponding to the user speech, first sub data corresponding to a private attribute and second sub data corresponding to a public attribute, obtaining combination information based on the user speech and the second sub data, transmitting the combination information to the server, and obtaining response information corresponding to the combination information from the server.

Obtaining the personal data may include identifying a plurality of sub words based on the user speech, where the personal data corresponding to the user speech is further obtained based on the identified plurality of sub words.

The private attribute may include an attribute set by the user so as to be not transmitted to the server.

The method may include outputting, based on essential information not being included in the combination information, first guide information to input the essential information.

The method may include obtaining normalization data by normalizing the first sub data with a predetermined function, where the combination information is further obtained based on the normalization data.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a diagram illustrating a system which includes an electronic apparatus and a server according to an embodiment;

FIG. 17 is a diagram illustrating group information which is used in obtaining normalization data based on first sub data according to an embodiment;

DETAILED DESCRIPTION

Figure 2:
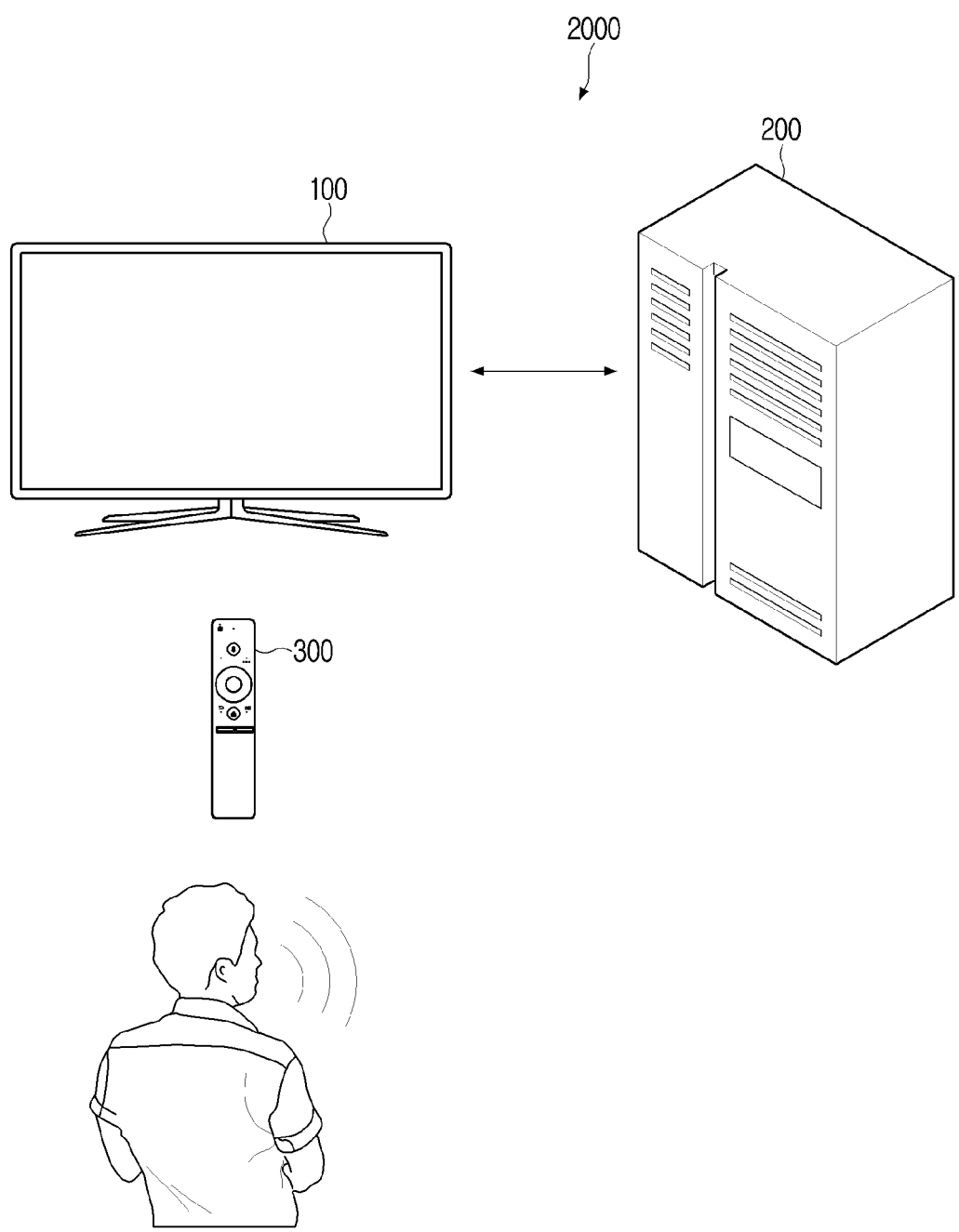
FIG. 2 is a diagram illustrating a system which includes an electronic apparatus, a remote controller, and a server according to an embodiment.

The disclosure will be described in detail below with reference to the accompanying drawings.

The terms used in describing the embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component, etc.), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element, or as being coupled through other element (e.g., third element).

A singular expression includes a plural expression, unless otherwise specified. It is to be understood that the terms such as "include" or "configured" are used herein to designate a presence of a characteristic, number, step, operation, element, component, or a combination thereof, and not to preclude a presence or a possibility of adding one or more of other characteristics, numbers, steps, operations, elements, components or a combination thereof The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor (not shown).

In this disclosure, the term "user" may refer to a person using an electronic apparatus or a device (e.g., artificial intelligence electronic device) using an electronic apparatus.

The disclosure will be described in greater detail below with reference to the accompanied drawings.

FIG. 1 is a diagram illustrating a system 100 which includes an electronic apparatus 100 and a server 200 according to an embodiment.

Referring to FIG. 1, the system 1000 may include the electronic apparatus 100 and the sever 200. The electronic apparatus 100 may refer to an apparatus which obtains a user speech. In addition, the electronic apparatus 100 may be an apparatus which includes a microphone. For example, the electronic apparatus 100 may be a smartphone, a home appliance, a tablet, a personal computer (PC), and the like which includes the microphone.

The electronic apparatus 100 may transmit the obtained user speech to the server 200. Specifically, the electronic apparatus 100 may convert an audio signal (or voice signal) obtained through the microphone to a digital signal, and transmit information associated with the digital signal (e.g., combination information) to the server 200.

The server 200 may be a device which performs a service of providing a natural language processing result. The server 200 may receive a voice signal or text information corresponding to the voice signal from the electronic apparatus 100. In addition, the server 200 may obtain response information based on information associated with the digital signal (e.g., combination information) received from the electronic apparatus 100, and transmit the obtained response information back to the electronic apparatus 100.

FIG. 2 is a diagram illustrating a system 2000 which includes an electronic apparatus 100, a remote controller 300, and a server 200 according to an embodiment.

Referring to FIG. 2, the system 2000 may include the electronic apparatus 100, the remote controller 300, and the server 200.

The remote controller 300 may be a device for controlling the electronic apparatus 100. A user may control the electronic apparatus 100 through the remote controller 300. For example, the electronic apparatus 100 may receive a user command through the remote controller 300. The remote controller 300 may include the microphone. Further, the remote controller 300 may receive the user speech through the microphone. Further, the remote controller 300 may transmit the user speech to the electronic apparatus 100.

The electronic apparatus 100 may store the user speech received from the remote controller 300, and transmit the stored user speech to the server 200. Because operations thereafter are the same as with the operations in FIG. 1, redundant descriptions will be omitted.

Figure 3:
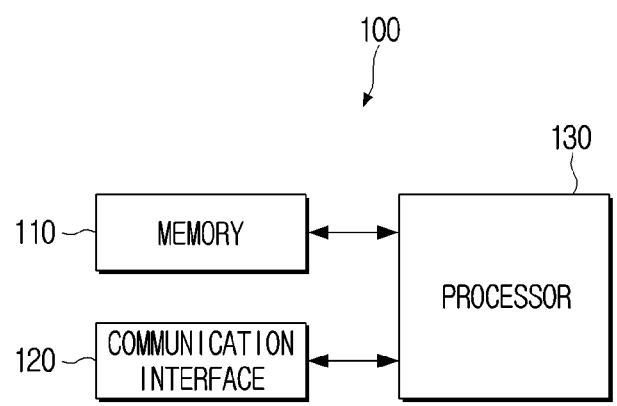
FIG. 3 is a block diagram illustrating an electronic apparatus according to an embodiment.

FIG. 3 is a block diagram illustrating the electronic apparatus 100 according to an embodiment.

Referring to FIG. 3, the electronic apparatus 100 may include a memory 110, a communication interface 120, and a processor 130.

The electronic apparatus 100 according to various embodiments of the disclosure may include, for example, at least one from among a smartphone, a tablet PC, a mobile phone, a desktop PC, a laptop PC, a personal digital assistance (PDA), and a portable multimedia player (PMP). In certain embodiments, the electronic apparatus 100 may include, for example, at least one from among a television, a digital video disk (DVD) player, a media box (e.g., HOMESYNC™, APPLE TV™, or GOOGLE TV™).

The memory 110 may be implemented as an internal memory such as, for example, and without limitation, a read only memory (ROM) (e.g., electrically erasable programmable read-only memory (EEPROM)), a random access memory (RAM), or the like included in the processor 130, or implemented as a memory separate from the processor 130. In this case, the memory 110 may be implemented in a memory form embedded to the electronic apparatus 100 according to a data storage use, or implemented in a memory form detachable or attachable to the electronic apparatus 100. For example, data for driving the electronic apparatus 100 may be stored in a memory embedded to the electronic apparatus 100, and data for an expansion function of the electronic apparatus 100 may be stored in a memory attachable or detachable from the electronic apparatus 100.

The memory embedded to the electronic apparatus 100 may be implemented as at least one from among a volatile memory (e.g., dynamic RAM (DRAM), static RAM (SRAM), or synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash, etc.), a hard disk drive (HDD) or a solid state drive (SSD)). In the case of a memory attachable or detachable to the electronic apparatus 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., universal serial bus (USB) memory) connectable to a USB port, or the like.

The communication interface 120 may be a configuration performing communication with an external device of various types according to a communication method of various types. The communication interface 120 may include a wireless communication module or a wired communication module. Each communication module may be implemented as at least one hardware chip form.

The wireless communication module may be a module which communicates with the external device via wireless communication. For example, the wireless communication module may include at least one from among a Wi-Fi module, a Bluetooth module, an infrared communication module, or other communication module.

The Wi-Fi module and the Bluetooth module may each perform communication in a Wi-Fi method and a Bluetooth method. When using the Wi-Fi module or the Bluetooth module, various connection information such as a service set identifier (SSID) and a session key may first be transmitted and received, and various information may be transmitted and received after communicatively coupling using the connection information.

The infrared communication module may perform communication according to an infrared communication (Infrared Data Association (IrDA)) technology of transmitting data wirelessly in short range by using infrared rays present between visible rays and millimeter waves.

The other communication module may include at least one communication chip configured to perform communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like in addition to the above-described communication method.

The wired communication module may be a module communicating with the external apparatus via wired communication. For example, the wired communication module may include at least one from among a local area network (LAN) module, an Ethernet module, a pair cable, a coaxial cable, an optical fiber cable, or an ultra wide-band (UWB) module.

The processor 130 may perform the overall control operation of the electronic apparatus 100. Specifically, the processor 130 may perform the function of controlling the overall operation of the electronic apparatus 100.

The processor 130 may be implemented as a digital signal processor (DSP) for processing a digital signal, a microprocessor, or a time controller (TCON). However, the embodiment is not limited thereto, and may include one or more from among a central processing unit (CPU), a micro controller unit (MCU), a micro processing unit (MPU), a controller, an application processor (AP), a graphics-processing unit (GPU), a communication processor (CP), an ARM processor, or the like, or may be defined by the corresponding term. In addition, the processor 130 may be implemented as a System on Chip (SoC) or a large scale integration (LSI) in which a processing algorithm is embedded, and may be implemented in the form of a field programmable gate array (FPGA). In addition, the processor 130 may perform various functions by executing computer executable instructions stored in the memory 110.

The electronic apparatus 100 may include the memory 100 which stores personal data associated with the user and the communication interface 120 which communicates with the server. The personal data may include at least one from among user profile data or user history data. The user profile data may refer to static data such as, for example, and without limitation, physical information, address information, work information, and the like associated with the user. In addition, the user history data may refer to data which is updated such as, for example, and without limitation, reservation information, purchase information, search keyword information, and the like.

The processor 130 may obtain, based on receiving the user speech, the personal data corresponding to the user speech from among the personal data stored in the memory, identify first sub data corresponding to a private attribute from among the obtained personal data and second sub data corresponding to a public attribute, obtain combination information based on the user speech and the second sub data, transmit the combination information to the server through the communication interface 120, and obtain the response information corresponding to the combination information from the server through the communication interface 120.

The processor 130 may receive the user speech.

According to an embodiment, the user speech may be directly received in the electronic apparatus 100. The electronic apparatus 100 may include a microphone 170. The description associated therewith may correspond to the embodiment of FIG. 1.

According to another embodiment, the user speech may be received in the external device (e.g., remote controller) which is not the electronic apparatus 100. The electronic apparatus 100 may receive the user speech from the external device. The description associated therewith may correspond to the embodiment of FIG. 2.

When the user speech is received, the processor 130 may provide the response information corresponding to the user speech. The response information may be the natural language processing result. The processor 130 may use a natural language processing model included in the server 200 to obtain the natural language processing result. Specifically, the processor 130 may transmit the user speech and the personal data to the server 200. Then, the natural language processing model in the server 200 may generate the response information based on the user speech and the personal data received from the electronic apparatus 100. Then, the server 200 may transmit the response information to the electronic apparatus 100. Accordingly, the processor 130 may receive the response information generated by the natural language processing model of the server 200, and provide the response information to the user.

The processor 130 may obtain the personal data corresponding to the received user speech. The processor 130 may obtain the personal data corresponding to the user speech from among a plurality of the personal data stored in the memory 110. Specifically, the processor 130 may identify the personal data suitable to the user speech. Based on analyzing all of the plurality of the personal data, a processing time may be increased. Accordingly, the processor 130 may identify specific the personal data associated with the user speech. A specific example associated therewith will be described in FIG. 10.

The electronic apparatus 100 leaking the personal data to the server 200 may lead to a certain degree of danger to security. Accordingly, the processor 130 may not transmit the personal data as is to the server 200

Accordingly, the processor 130 may not transmit the personal data as is to the server 200. The processor 130 may obtain the combination information based on a portion (second sub data) from among the user speech and the personal data. Then, the processor 130 may transmit the combination information to the server 200.

The processor 130 may identify the first sub data and the second sub data by subdividing the personal data. The first sub data may refer to data having a private attribute. The first sub data may be data which the user does not desire to transmit to an outside. The second sub data may refer to data corresponding to a public attribute. The second sub data may refer to data which is irrelevant (from a perspective of the user) even if it is transmitted to the outside. The private attribute may be described as a first attribute, and the public attribute may be described as a second attribute.

The private attribute may refer to an attribute representing that sensitive information is included. For example, the user may set in advance a type of data which is not desired to be leaked to the server 200 and the like. For example, it may be assumed that the user does not desire for time information, attendee information, amount information and the like to be transmitted to the external device. The processor 130 may determine time information, attendee information, amount information, and the like as the private attribute according to a user setting.

Figure 10:
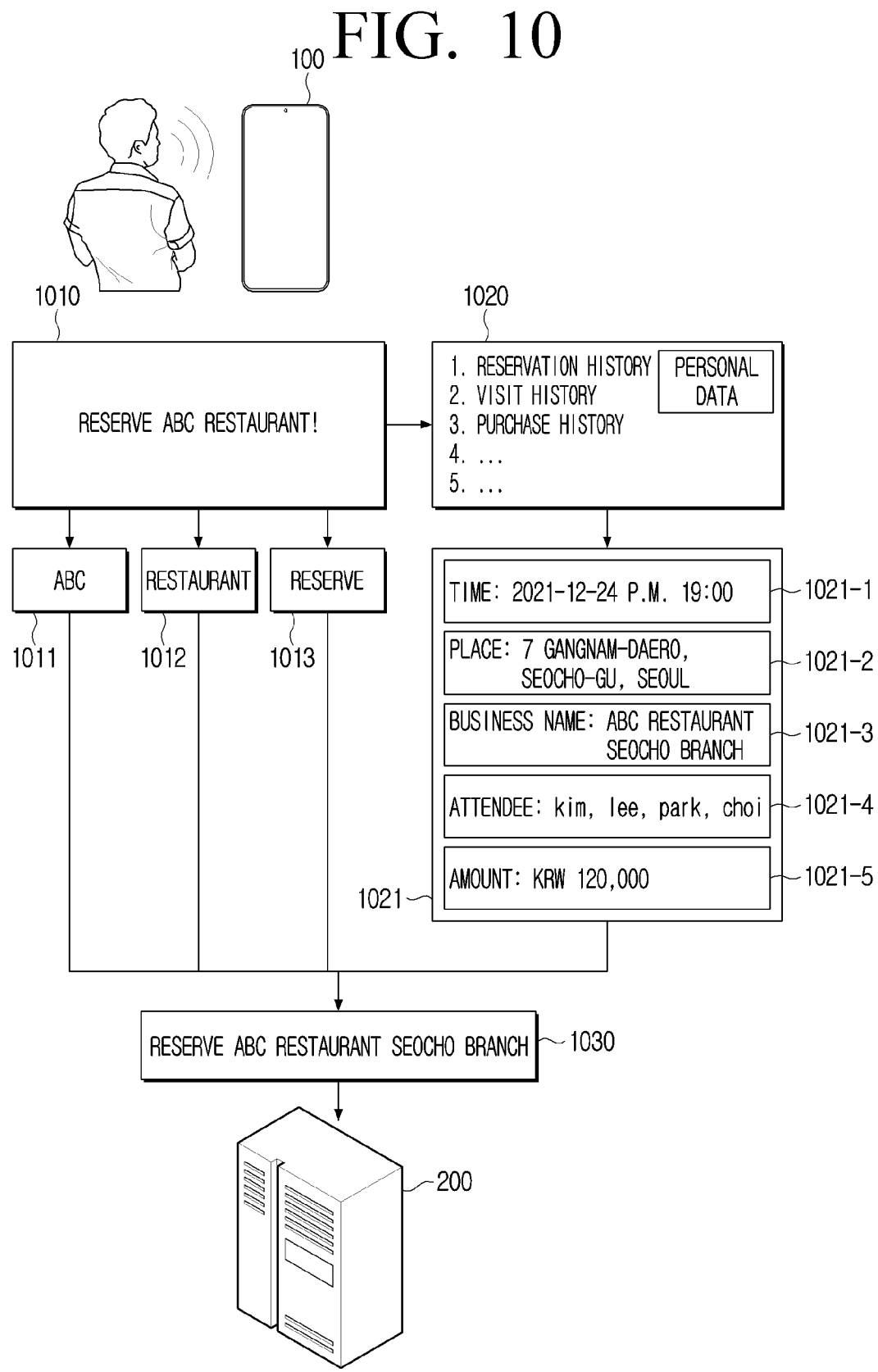
FIG. 10 is a diagram illustrating an operation of generating combination information by classifying first sub data and second sub data according to an embodiment.

Referring to an embodiment of FIG. 10, the first sub data may be time information, attendee information, and amount information, and the second sub data may be place information and business name information. The private attribute may be time, attendee, amount, and the like.

The processor 130 may classify the plurality of data included in the personal data as the first sub data and the second sub data based on a predetermined attribute.

The processor 130 may determine the first sub data as data which the user does not desire to transmit to the server 200. Accordingly, the processor 130 may not consider the first sub data in generating the combination information. The processor 130 may obtain (or generate) the combination data by using the user speech and the second sub data.

Then, the processor 130 may transmit the obtained combination information to the server 200. Then, the server 200 may obtain (or generate) the response information based on the received the combination information. Then, the server 200 may transmit the response information to the electronic apparatus 100. The processor 130 may receive the response information from the server 200, and provide the response information to the user.

According to an embodiment, the response information may be image formation. The processor 130 may display the response information in a display 140. According to another embodiment, the response information may be audio information. The processor 130 may output the response information through a speaker 160.

Provided herein are various methods for obtaining the personal data.

According to an embodiment, the processor 130 may obtain the personal data based on the user speech itself.

According to another embodiment, the processor 130 may divide the user speech to a plurality of sub words, and obtain the personal data based on the divided plurality of sub words. For example, the processor 130 may divide the user speech to a plurality of words, and obtain the personal data based on each of the divided plurality of words.

The processor 130 may identify the plurality of sub words based on the user speech, and obtain the personal data corresponding to the user speech from among the plurality of the personal data based on the identified plurality of sub words.

The processor 130 may divide the user speech to the plurality of sub words. Then, the processor 130 may compare the divided plurality of sub words with the plurality of the personal data stored in the memory 110. Specifically, the processor 130 may search the personal data associated with a sub word. The processor 130 may search the personal data associated with each of the plurality of sub words.

The private attribute may be an attribute set by the user so as to be not transmitted to the server.

The processor 130 may identify the personal data corresponding to the user speech. Then, the processor 130 may determine data corresponding to the private attribute from among the whole data included in the identified the personal data as the first sub data. Then, the processor 130 may determine data which is not determined as the first sub data from among the whole data included in the personal data as the second sub data. The private attribute may refer to an attribute which is classified as sensitive information. The attribute may refer to a data type. In addition, the attribute may be changed by the user.

The processor 130 may output, based on essential information not being included in the combination information, first guide information for inputting the essential information.

The natural language processing model may generate the response information based on the combination information. If data included in the combination information is insufficient, the natural language processing model may not output the response information normally. Even if the natural language processing model obtains the response information, a number of data may be too much or accuracy may decrease. Accordingly, the natural language processing model may determine that the essential information is not included in the combination information under a predetermined condition. The predetermined condition may include a case in which a result included in the response information is greater than or equal to a threshold value.

Accordingly, the natural language processing model may additionally request essential information to the user to provide the response information with high accuracy. The processor 130 may guide for the user to additionally input essential information by outputting the first guide information. The detailed description associated therewith will be described in FIG. 13 and FIG. 14.

The processor 130 may obtain normalization data by normalizing the first sub data with a predetermined function, and obtain the combination information based on the user speech, the second sub data, and the normalization data.

The predetermined function may refer to a function for changing the first sub data to the normalization data. Specifically, the first sub data may be data including the sensitive information, and the normalization data may be data of a form in which the sensitive information is changed. In addition, the predetermined function may refer to a function which determines input data as one group from among predetermined groups. Operations for obtaining the normalization data and the detailed description associated with the predetermined groups will be described in FIG. 15 to FIG. 17.

If the first sub data is used as is, there is the danger of the sensitive information being transmitted to the server 200. Accordingly, the processor 130 may obtain the normalization data to use the first sub data in the changed form. Specifically, the processor 130 may obtain the combination information based on the user speech, the normalization data which changed the first sub data, and the second sub data. Because the normalization data is not the first sub data and is a changed form based on the predetermined function, the sensitive information may not be included in the combination information.

The processor 130 may identify, based on the first sub data including a number, a group corresponding to the first sub data from among a predetermined plurality of groups, and obtain the identified group with the normalization data.

The processor 130 may identify, based on identifying the number included in the first sub data, a group corresponding to the first sub data based on the data type and number of the first sub data. The electronic apparatus 100 may store group information which includes a plurality of groups according to the data type and a criterion corresponding to the plurality of groups in the memory 110. Accordingly, the processor 130 may identify a group corresponding to the first sub data based on the group information.

In an example, it may be assumed that the first sub data is time information (2021-12-24 P.M. 19:00) of having visited a specific restaurant. The processor 130 may determine a group (weekday dinner) corresponding to the time information (2021-12-24 P.M. 19:00). The group (weekday dinner) may be the normalization data.

In another example, it may be assumed that the first sub data is amount information (KRW 120,000) which was paid at the specific restaurant. The processor 130 may determine a group (medium amount) corresponding to the amount information (KRW 120,000). The group (medium amount) may be the normalization data.

The description associated with the group information will be described in FIG. 17.

The processor 130 may identify, based on names being included in the first sub data, a number of persons based on the names included in the first sub data, and obtain the number of persons as the normalization data.

The names may correspond to the sensitive information. For example, attendee information may include names. Accordingly, if names are included in the first sub data, the processor 130 may obtain the number of persons based on a number of names as the normalization data.

In an example, it may be assumed that the first sub data is the attendee information (kim, lee, park, choi) of those who visited the specific restaurant. The processor 130 may determine the number of persons (4 persons) corresponding to the attendee information (kim, lee, park, choi). The number of persons (4 persons) may be the normalization data.

Provided herein are various methods to using normalization data in obtaining the response information.

According to an embodiment, the processor 130 may generate the combination information based on the user speech, the normalization data, and the second sub data. Then, the processor 130 may transmit the combination information to the server 200. The server 200 may generate the response information based on the combination information received from the electronic apparatus 100. The description associated therewith will be described in FIG. 15 to FIG. 17.

According to another embodiment, the processor 130 may generate the combination information based on the user speech and the second sub data. Then, the processor 130 may generate the normalization data based on the first sub data. The processor 130 may transmit each of the combination information and the normalization data to the server 200. The server 200 may generate the response information based on the combination information and the normalization data received from the electronic apparatus 100. The description associated therewith will be described in FIG. 18 and FIG. 19.

In the above-described description, the embodiment of obtaining the response information without using the first sub data when the first sub data is identified or the embodiment of obtaining the response information by changing the first sub data to the normalization data is described.

According to an embodiment, when the first sub data is identified, the processor 130 may question the user as to whether to transmit the first sub data to the server 200. The processor 130 may obtain a final selection from the user and perform an operation which coincides with a user intent.

The processor 130 may output, based on the first sub data which corresponds to the private attribute being identified from among the personal data, second guide information for checking whether to transmit the first sub data, and obtain, based on a user input for not transmitting the first sub data to the server 200 being received through the second guide information, the combination information based on the user speech and the second sub data.

The second guide information may include a content questioning the user as to whether to transmit the first sub data to the server 200. If a command, by the user, for transmitting the first sub data to the server 200 is received, the processor 130 may obtain the combination information based on the user speech, the first sub data, and the second sub data as an exception. Then, the processor 130 may transmit the combination information to the server 200.

The operation of outputting the second guide information will be described in FIG. 7 to FIG. 8.

The processor 130 may change, based on the first sub data corresponding to the private attribute being identified from among the personal data, a portion from among texts corresponding to the first sub data to a predetermined symbol, and output the second guide information including the changed first sub data.

The second guide information may be included with the first sub data. The first sub data may correspond to information which the user does not desire to expose. Accordingly, the processor 130 may use the predetermined symbol so as to conceal a portion of the first sub data included in the second guide information. The processor 13 may substitute a portion of letters of the first sub data with the predetermined symbol (e.g., *). The description associated therewith will be described in FIG. 9.

The electronic apparatus 100 may further include the microphone 170 and the display 140, and the processor 130 may obtain the user speech from the microphone, control the display 140 to display the combination information when the combination information is obtained, and control the display 140 so as to display the response information when the response information is obtained.

The processor 130 may directly receive the user speech through the microphone 170. Then, the processor 130 may convert the voice signal obtained through the microphone 170 to the digital signal. Then, the processor 130 may obtain the converted digital signal as the user speech.

The processor 130 may display at least one from among the combination information or the response information in the display 140. If the combination information is displayed, the user may directly check the content provided to the server 200. In addition, if the response information is displayed, the user may be provided with the response information which is the natural language processing result.

In the above-described description, the input data has been described as the user speech. However, according to an embodiment, the electronic apparatus 100 may obtain the response information based simply on an input string rather than the user speech. The user speech may be described as the user input.

In the above-described description, the electronic apparatus 100 has been described as not considering the first sub data in generating the combination information. However, according to an embodiment, the electronic apparatus 100 may use all of the user speech, the first sub data, and the second sub data in generating the combination information. The electronic apparatus 100 may control such that the data itself which is included in the first sub data is not included in the combination information. Specifically, the electronic apparatus 100 may delete the word itself which is included in the first sub data from the combination information.

The electronic apparatus 100 may first identify the personal data associated with the user speech. Then, the electronic apparatus 100 may separately identify the first sub data which includes the sensitive information from among the identified personal data. The electronic apparatus 100 may generate the combination information except for the first sub data. Accordingly, the combination information transmitted to the server 200 may not be included with the sensitive information. Because the electronic apparatus 100 uses only the second sub data which does not include the sensitive information as personal information, only the personal information which the user does not desire to expose may be selectively used. Accordingly, an accuracy in the natural language processing may be increased than when personal information is not used altogether, and security may be enhanced than when personal information is used altogether.

In the above, only a simple configuration configuring the electronic apparatus 100 has been shown and described, but various configurations may be additionally included at implementation. The description associated therewith will be described below with reference to FIG. 4.

Figure 4:
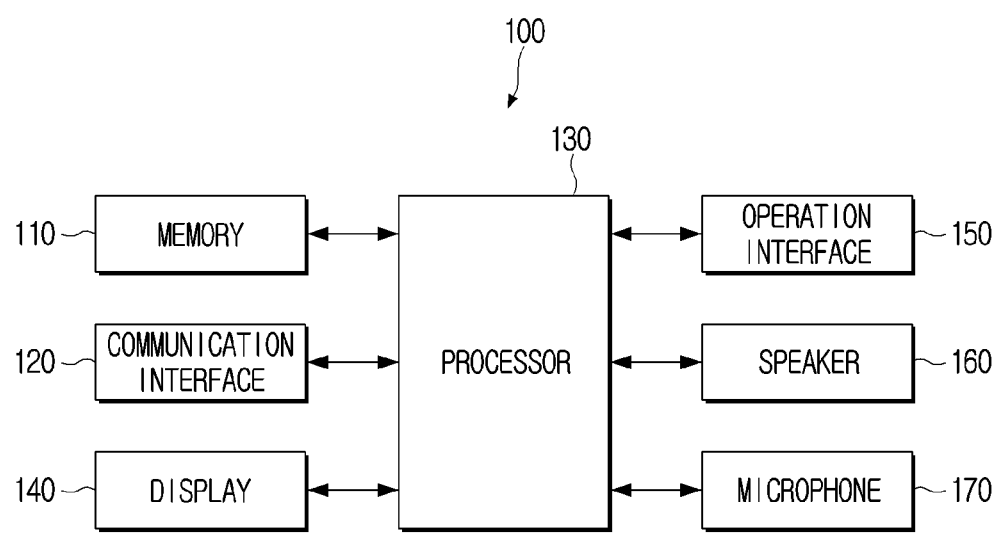
FIG. 4 is a block diagram illustrating a detailed configuration of the electronic apparatus of FIG. 3 according to an embodiment.

FIG. 4 is a block diagram illustrating a detailed configuration of the electronic apparatus of FIG. 3 according to an embodiment.

Referring to FIG. 4, the electronic apparatus 100 may include the memory 110, the communication interface 120, the processor 130, the display 140, an operation interface 150, the speaker 160, and the microphone 170.

Redundant descriptions of operations which are the same as those described above from among the operations of the memory 110, the communication interface 120, and the processor 130 will be omitted.

The display 140 may be implemented as a display of various forms such as, for example, and without limitation, a liquid crystal display (LCD), an organic light emitting diode (OLED) display, a plasma display panel (PDP), and the like. In the display 140, a driving circuit, which may be implemented in the form of an a-si TFT, a low temperature poly silicon (LTPS) TFT, an organic TFT (OTFT), or the like, a backlight unit, and the like may be included. The display 140 may be implemented as a touch screen coupled with a touch sensor, a flexible display, a three-dimensional (3D) display, or the like. In addition, according to an embodiment of the disclosure, the display 140 may not only include a display panel which outputs an image, but also a bezel which houses the display panel. Specifically, according to an embodiment of the display, the bezel may include a touch sensor (not shown) for detecting a user interaction.

The operation interface 150 may be implemented as a device such as a button, a touch pad, a mouse and a keyboard, or implemented also as a touch screen capable of performing the above-described display function and the operation input function together therewith. The button may be a button of various types such as a mechanical button, a touch pad, or a wheel which is formed at a random area at a front surface part or a side surface part, a rear surface part, or the like of an exterior of a main body of the electronic apparatus 100.

The speaker 160 may be an element which outputs not only various audio data, but also various notification sounds, voice messages, or the like.

The microphone 170 may be a configuration for receiving input of the user speech or various sounds and converting to audio data. The microphone 170 may receive a speech of a user while in an activated state. For example, the microphone 170 may be formed integrally to an upper side or a front surface direction, a side surface direction, or the like of the electronic apparatus 100. The microphone 170 may include various configurations such as, for example, and without limitation, a microphone which collects the user speech in analog form, an amplifier circuit which amplifies the collected user speech, an A/D converter circuit which samples the amplified user speech and converts to a digital signal, and a filter circuit which removes a noise component from the converted digital signal.

Figure 5:
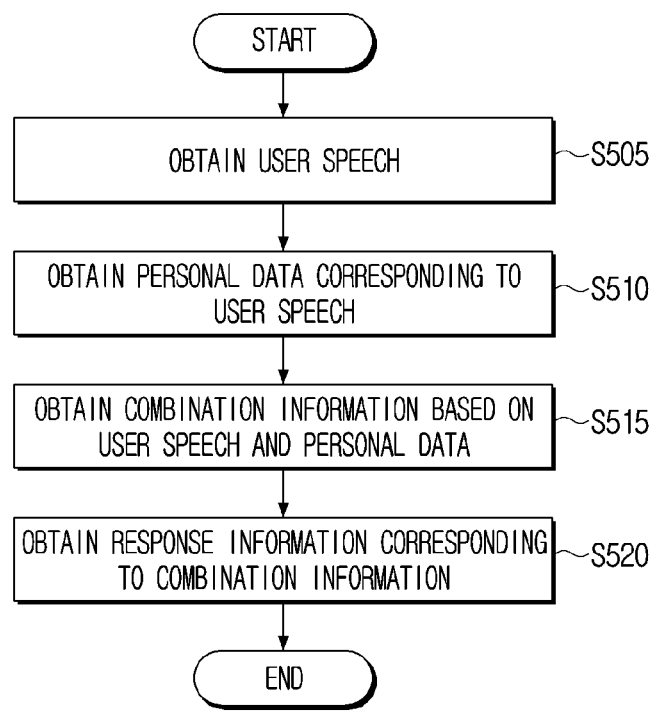
FIG. 5 is a flowchart illustrating an operation of obtaining response information when a user speech is obtained according to an embodiment.

FIG. 5 is a flowchart illustrating an operation of obtaining the response information when a user speech is obtained according to an embodiment.

Referring to FIG. 5, the electronic apparatus 100 may obtain the user speech (operation S505). Then, the electronic apparatus 100 may obtain the personal data corresponding to the user speech (operation S510). Specifically, the electronic apparatus 100 may obtain the personal data corresponding to the user speech from among the personal data associated with the user. Then, the electronic apparatus 100 may obtain the combination information based on the user speech and the personal data (operation S515). Then, the electronic apparatus 100 may obtain the response information corresponding to the combination information (operation S520).

According to an embodiment, the electronic apparatus 100 may transmit the obtained combination information to the server 200. Then, the server 200 may provide a service corresponding to the combination information. Specifically, the server 200 may obtain the response information corresponding to the combination information and transmit to the electronic apparatus 100. The electronic apparatus 100 may obtain the response information from the server 200. Then, the electronic apparatus 100 may provide the combination information obtained from the server 200 to the user.

According to another embodiment, the electronic apparatus 100 may provide the user speech and the personal data corresponding to the user speech directly to the server 200. Then, the server 200 may generate the combination information based on the user speech and the personal data corresponding to the user speech received from the electronic apparatus 100, and obtain the response information corresponding to the combination information. Then, the server 200 may transmit the response information to the electronic apparatus 100.

Figure 6:
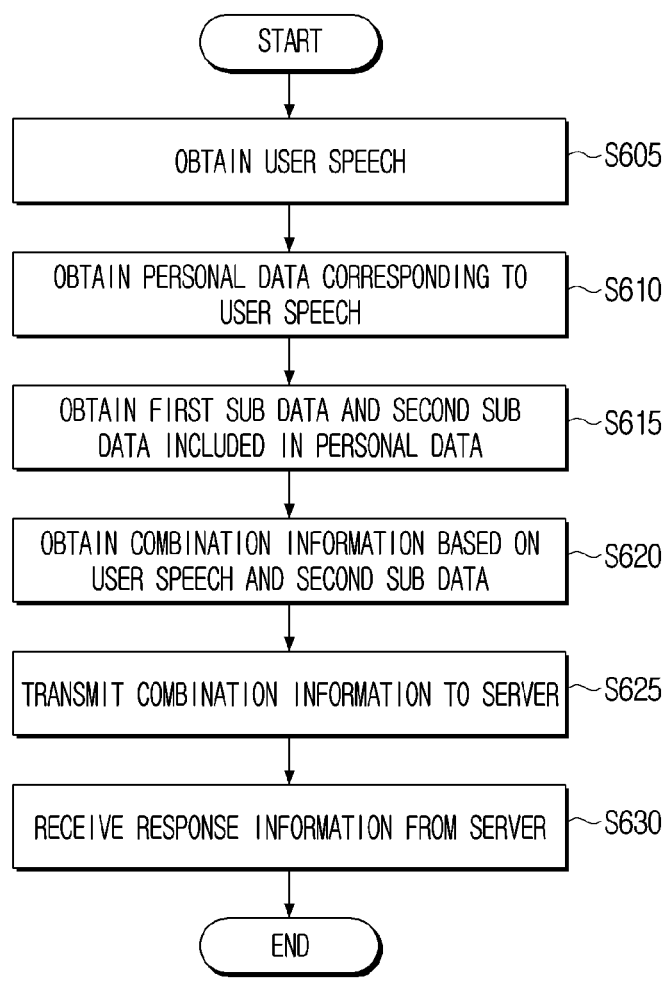
FIG. 6 is a flowchart illustrating an operation of obtaining response information by analyzing user speech and personal data according to an embodiment.

FIG. 6 is a flowchart illustrating an operation of obtaining the response information by analyzing the user speech and the personal data according to an embodiment.

Referring to FIG. 6, the electronic apparatus 100 may obtain the user speech (operation S605). Then, the electronic apparatus 100 may obtain the personal data corresponding to the user speech (operation S610). Then, the electronic apparatus 100 may obtain the first sub data and the second sub data included in the personal data (operation S615). Then, the electronic apparatus 100 may obtain the combination information based on the user speech and the second sub data (operation S620). Then, the electronic apparatus 100 may transmit the combination information to the server 200 (operation S625). The server 200 may generate the response information based on the combination information received from the electronic apparatus 100. Then, the server 200 may transmit the response information to the electronic apparatus 100. The electronic apparatus 100 may receive the response information from the server 200 (operation S630).

Figure 7:
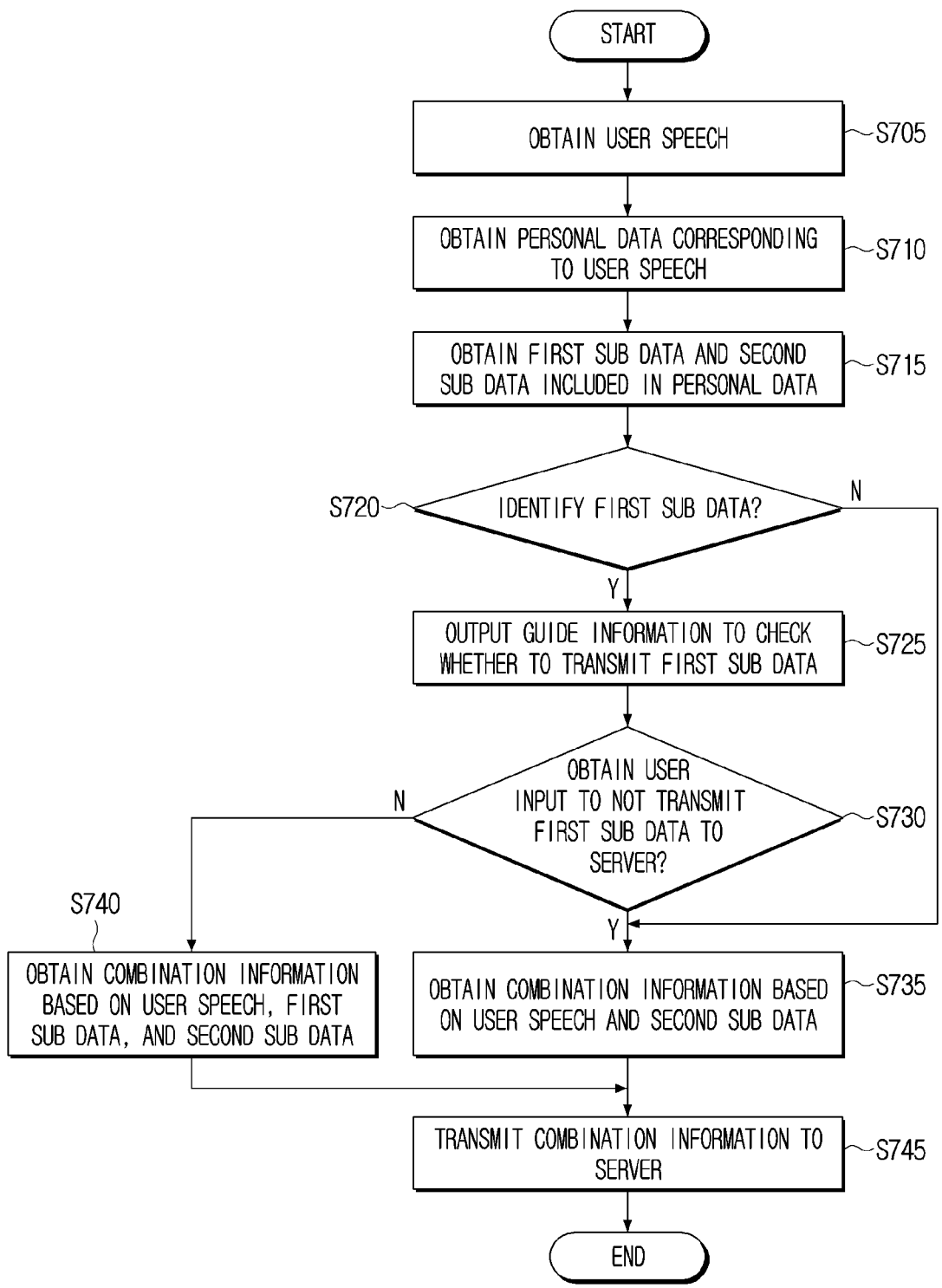
FIG. 7 is a flowchart illustrating an operation being performed according to whether first sub data is identified according to an embodiment.

FIG. 7 is a flowchart illustrating an operation being performed according to whether first sub data is identified according to an embodiment.

Referring to FIG. 7, operations S705, S710, and S715 may correspond to operations S605, S610, and S615 in FIG. 6. Accordingly, redundant descriptions will be omitted. The electronic apparatus 100 may determine whether the first sub data included in the personal data is identified (operation S720).

The first sub data may refer to data corresponding to the private attribute. For example, the first sub data may refer to data which includes sensitive personal information. The user may allocate attributes for each data to protect the data which includes the sensitive personal information, and determine the data corresponding to the private attribute as the first sub data.

If the first sub data is not identified in the personal data (operation S720-N), the electronic apparatus 100 may directly obtain the combination information based on the user speech and the second sub data (operation S735). If the first sub data is identified in the personal data (operation S720-Y), the electronic apparatus 100 may output guide information to check whether to transmit the first sub data (operation S725). The detailed description associated with the guide information will be described in FIG. 8 and FIG. 9. The user may determine whether to transmit the first sub data to the server 200 according to the output guide information.

The electronic apparatus 100 may determine if the user input to not transmit the first sub data to the server 200 has been obtained (operation S730). If the user input to not transmit the first sub data to the server 200 is obtained (operation S730-Y), the electronic apparatus 100 may obtain the combination information based on the user speech and the second sub data (operation S735). If the user input to not transmit the first sub data to the server 200 is not obtained (operation S730-N), the electronic apparatus 100 may obtain the combination information based on the user speech, the first sub data, and the second sub data (operation S740).

Then, the electronic apparatus 100 may transmit the combination information obtained from operation S735 or operation S740 to the server 200 (operation S745).

Figure 8:
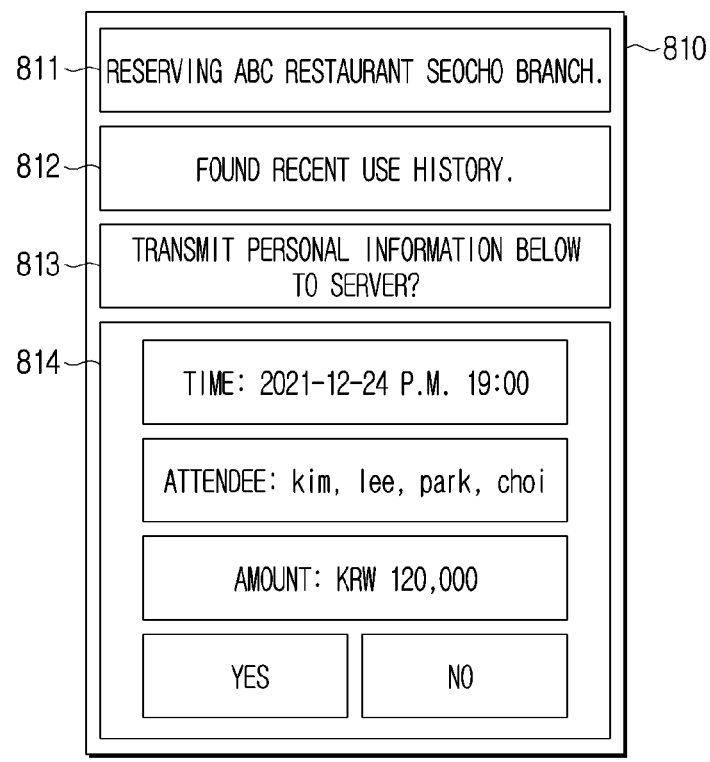
FIG. 8 is a diagram illustrating guide information which questions whether first sub data is to be transmitted to a server according to an embodiment.

FIG. 8 is a diagram illustrating guide information which questions whether first sub data is to be transmitted to the server 200 according to an embodiment.

Referring to FIG. 8, if the first sub data is included in the personal data corresponding to the user speech, the electronic apparatus 100 may output guide information 810. The guide information 810 may include a guide user interface (UI) or a guide screen. The guide information 810 may include at least one from among a UI 811 including information corresponding to the user speech, a UI 812 including information for notifying that the first sub data has been identified, a UI 813 including information for questioning whether to transmit the first sub data to the server 200, or a UI 814 including the first sub data.

Because the first sub data can include time, attendee, amount, or the like, the first sub data may be sensitive personal information. Accordingly, the electronic apparatus 100 may output the guide information 810 questioning the user as to whether the corresponding personal information is to be transmitted to the server 200. The user may select whether to send the sensitive personal information to the outside through the output guide information 810.

Figure 9:
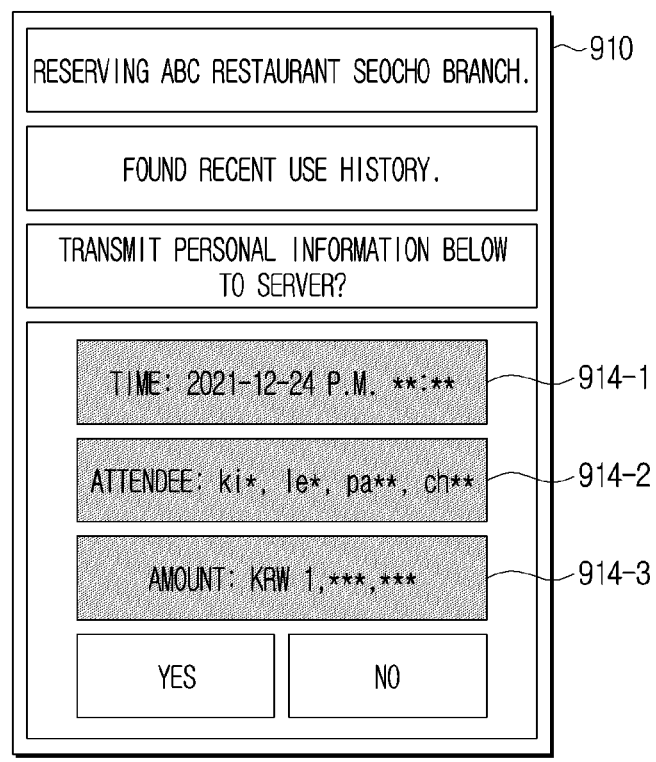
FIG. 9 is a diagram illustrating an operation of concealing a portion of first sub data according to an embodiment.

FIG. 9 is a diagram illustrating an operation of concealing some of first sub data according to an embodiment.

Referring to FIG. 9, because guide information 910 can correspond to the guide information 810 in FIG. 8, redundant descriptions will be omitted. The guide information 910 may be displayed such that a portion from among the first sub data may be displayed in symbols unlike the guide information 810 in FIG. 8. This is to prevent exposure of personal information. The electronic apparatus 100 may change a portion from among the first sub data to the predetermined symbol (e.g., *). The electronic apparatus 100 may change a portion of each of the data to the predetermined symbol, and not change all data included in the first sub data to the symbol.

The guide information 910 may include the first sub data, and the first sub data may include time data 914-1, attendee data 914-2, and amount data 914-3.

For example, the electronic apparatus 100 may change only a part corresponding to time from among the time data 914-1 to the predetermined symbol (*). In addition, the electronic apparatus 100 may change a last letter of a name from among the attendee data 914-2 to the predetermined symbol (e.g., ki*, le*). In addition, the electronic apparatus 100 may change by a degree equal to a predetermined percentage (e.g., 50%) of a whole name from among the attendee data 914-2 to the predetermined symbol (e.g., pa, ch). In addition, the electronic apparatus 100 may change a portion from among the amount data 914-3 to the predetermined symbol.

FIG. 10 is a diagram illustrating an operation of generating the combination information by classifying first sub data and second sub data according to an embodiment.

Referring to FIG. 10, the electronic apparatus 100 may obtain a user speech 1010. It may be assumed that the user speech 1010 is "reserve ABC restaurant."

The electronic apparatus 100 may obtain the plurality of sub words based on the user speech 1010. The plurality of sub words may be obtained. The plurality of sub words may be a first word 1011, a second word 1012, and a third word 1013. For example, if the user speech 1010 is "reserve ABC restaurant," the first word 1011 may be "ABC," the second word 1012 may be "restaurant," and the third word 1013 may be "reserve."

The electronic apparatus 100 may search the personal data corresponding to the user speech 1010. The electronic apparatus 100 may store a plurality of the personal data 1020 in the memory 110. The plurality of the personal data 1020 may include various information associated with the user of the electronic apparatus 100. For example, the plurality of the personal data 1020 may include at least one from among a reservation history, a visit history, or a purchase history.

The electronic apparatus 100 may identify, based on the user speech 1010 being obtained, personal data 1021 corresponding to the user speech 1010 from among the plurality of the personal data. The personal data 1021 may include at least one from among time information 1021-1, place information 1021-2, business name information 1021-3, attendee information 1021-4 or amount information 1021-5.

In FIG. 10, the user speech 1010 being used as is has been described to identify the personal data. However, the electronic apparatus 100 according to an embodiment may identify the personal data 1021 based on a plurality of words 1011, 1012, and 1013 divided from the user speech 1010.

The electronic apparatus 100 may obtain at least one sub data based on the personal data 1021. The electronic apparatus 100 may classify the first sub data and the second sub data from the personal data 1021. The first sub data may refer to data corresponding to the private attribute, and the second sub data may refer to data corresponding to the public attribute. The private attribute may refer to an attribute representing sensitive personal information or information which requires protection. The public attribute may refer to information which is irrelevant even if made public or information which does not require protection. The private attribute or the public attribute may vary according to a setting by the user.

For example, the first sub data may be the time information 1021-1, the attendee information 1021-4, and the amount information 1021-5 from among the personal data 1021. The second sub data may be the place information 1021-2 and the business name information 1021-3.

The electronic apparatus 100 may generate combination information 1030 by excluding the first sub data (e.g., 1021-1, 1021-4, 1021-5). Specifically, the electronic apparatus 100 may generate the combination information 1030 based on the second sub data (e.g., 1021-2, 1021-3) and the user speech 1010. The combination information 1030 may be information corresponding to the user speech 1010. For example, the combination information 1030 may be "reserve ABC restaurant Seocho branch." Then, the electronic apparatus 100 may transmit the generated combination information 1030 to the server 200.

Figure 11:
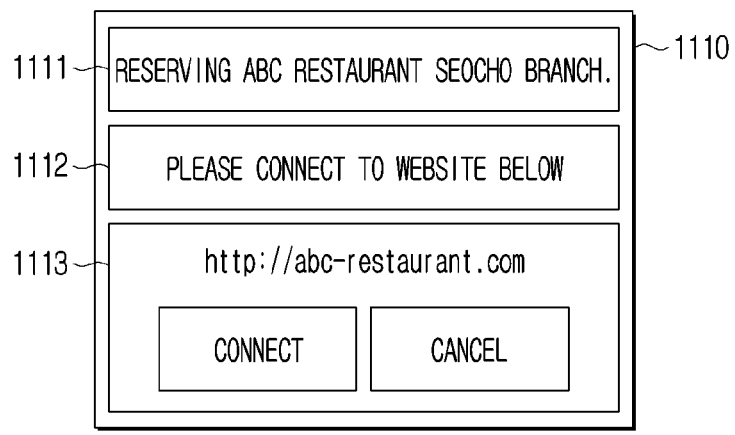
FIG. 11 is a diagram illustrating an operation of outputting response information according to an embodiment.

FIG. 11 is a diagram illustrating an operation of outputting the response information according to an embodiment.

Referring to FIG. 11, the server 200 may generate response information 1110 based on the combination information 1030 received from the electronic apparatus 100. The response information 1110 may include at least one from among a UI 1111 including a text corresponding to the combination information, a UI 1112 including guide information to guide the user, or a UI 1113 requesting a selection (or input) of the user.

Figure 12:
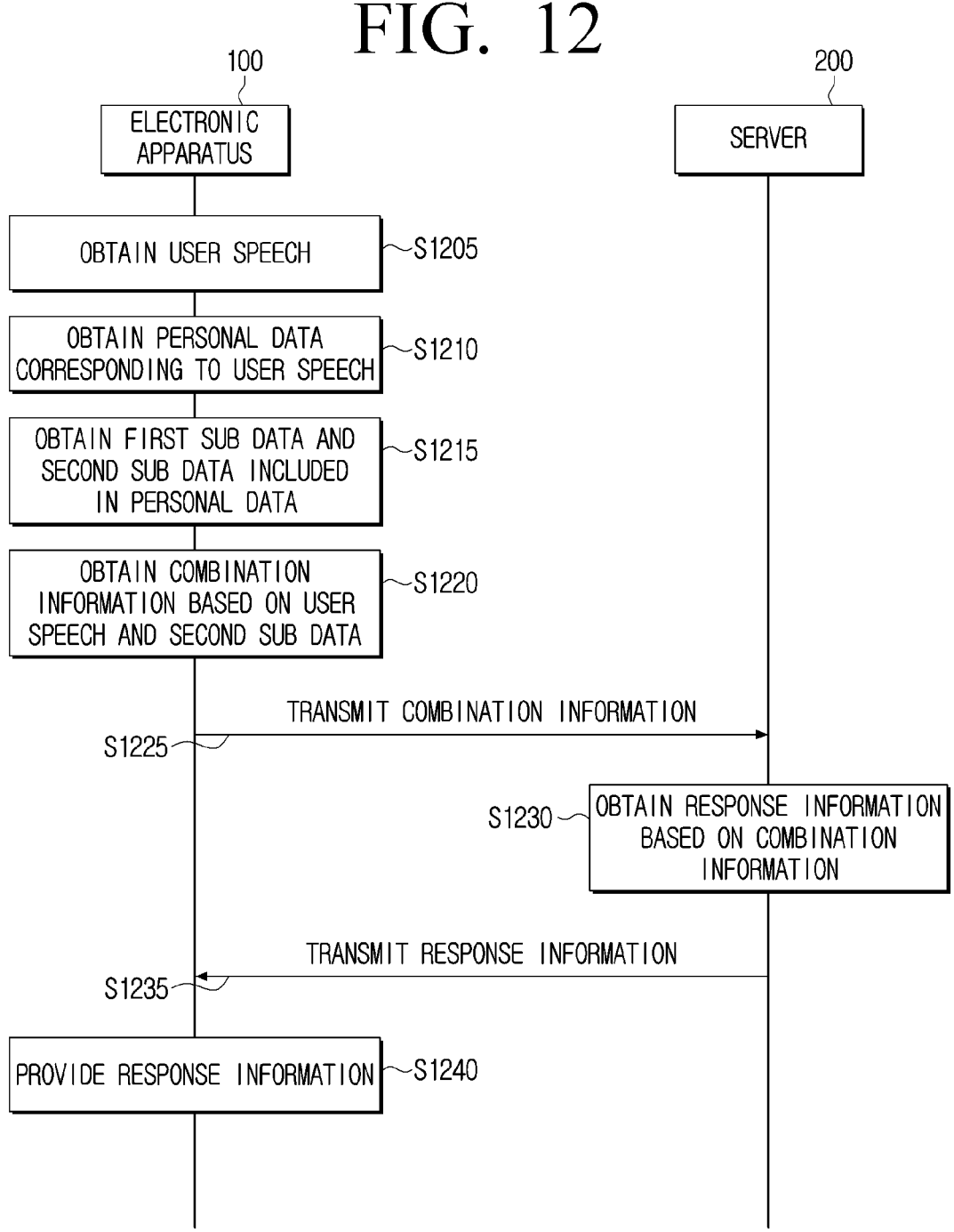
FIG. 12 is a flowchart illustrating an operation performed by an electronic apparatus and a server to provide response information according to an embodiment.

FIG. 12 is a flowchart illustrating an operation performed by the electronic apparatus 100 and the server 200 to provide the response information according to an embodiment.

Referring to FIG. 12, the electronic apparatus 100 may obtain the user speech (operation S1205). Then, the electronic apparatus 100 may obtain the personal data corresponding to the user speech (operation S1210). Then, the electronic apparatus 100 may obtain the first sub data and the second sub data included in the personal data (operation S1215). Then, the electronic apparatus 100 may obtain the combination information based on the user speech and the second sub data (operation S1220). Then, the electronic apparatus 100 may transmit the combination information to the server 200 (operation S1225).

The server 200 may receive the combination information from the electronic apparatus 100. Then, the server 200 may obtain the response information based on the combination information (operation S1230). Then, the server 200 may transmit the response information to the electronic apparatus 100 (operation S1235).

The electronic apparatus 100 may receive the response information from the server 200. Then, the electronic apparatus 100 may provide the response information to the user (operation S1240).

According to an embodiment, the response information may be image information. The electronic apparatus 100 may include the display 140, and the electronic apparatus 100 may display the response information through the display 140.

According to another embodiment, the response information may be audio information. The electronic apparatus 100 may include the speaker 160, and the electronic apparatus 100 may output the response information through the speaker 160.

Figure 13:
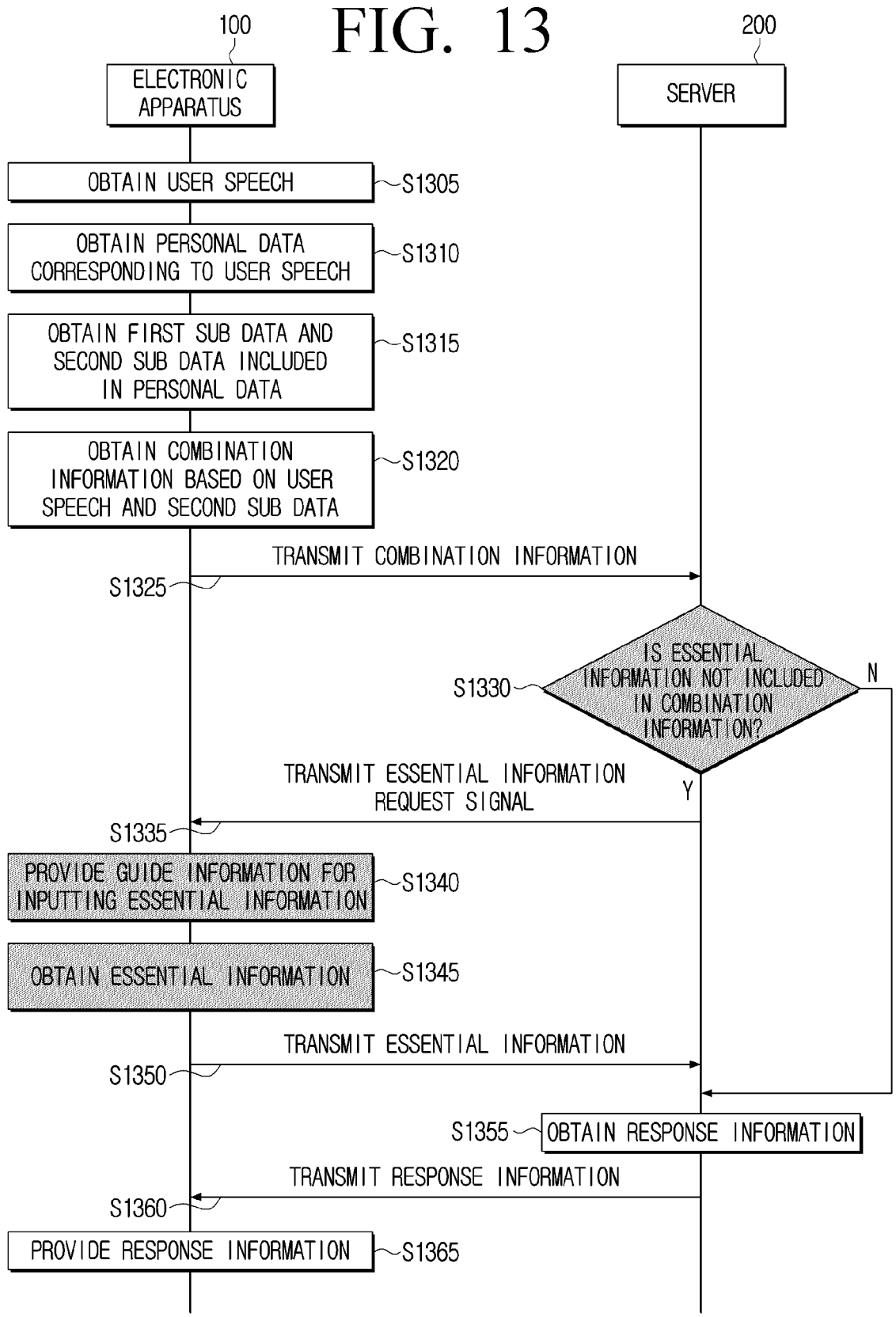
FIG. 13 is a flowchart illustrating an example of essential information not being included in combination information according to an embodiment.

FIG. 13 is a flowchart illustrating an example of essential information not being included in the combination information according to an embodiment.

Referring to FIG. 13, operations S1305, S1310, S1315, S1320, and S1325 may correspond to operations S1205, S1210, S1215, S1220, and S1225 in FIG. 12. Accordingly, redundant descriptions will be omitted.

The server 200 may receive the combination information from the electronic apparatus 100. Then, the server 200 may determine whether the essential information is not included in the combination information (operation S1330). If the essential information is not included in the combination information (operation S1330-N), the electronic apparatus 100 may directly obtain the response information based on the combination information (operation S1355).

If the essential information is not included in the combination information (operation S1330-Y), the server 200 may generate a signal requesting the essential information. Then, the server 200 may transmit the signal requesting the essential information to the electronic apparatus 100 (operation S1335).

The electronic apparatus 100 may receive the signal requesting the essential information from the server 200. Then, the electronic apparatus 100 may provide the guide information for inputting the essential information to the user (operation S1340). The detailed description of the guide information will be described in FIG. 14. The electronic apparatus 100 may obtain the essential information through the guide information provided to the user (operation S1345). Then, the electronic apparatus 100 may transmit the essential information to the server 200 (operation S1350).

The server 200 may receive the essential information from the electronic apparatus 100. Then, the electronic apparatus 100 may obtain the response information based on the combination information obtained from operation S1325 and the essential information obtained from operation S1350 (operation S1355). When the response information is obtained, the server 200 may transmit the response information to the electronic apparatus 100 (operation S1360).

The electronic apparatus 100 may receive the response information from the server 200. Then, the electronic apparatus 100 may provide the response information to the user (operation S1365).

Figure 14:
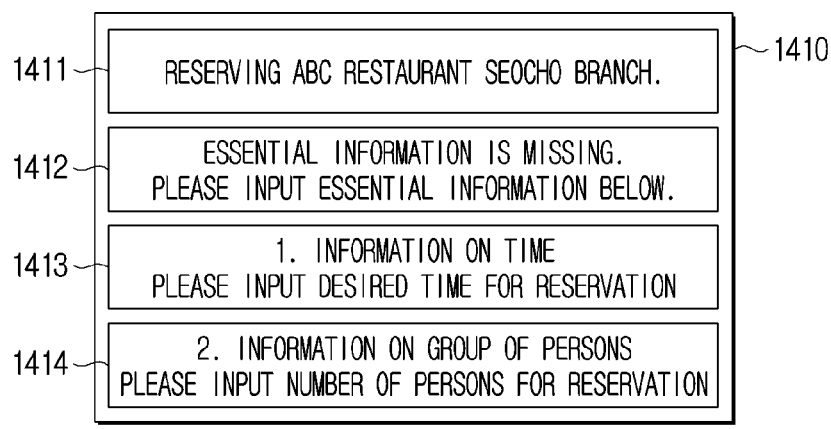
FIG. 14 is a diagram illustrating guide information being output when essential information is not included in combination information according to an embodiment.

FIG. 14 is a diagram illustrating guide information being output when essential information is not included in the combination information according to an embodiment.

Referring to FIG. 14, guide information 1410 may include at least one from among a UI 1411 including a text corresponding to the combination information, a UI 1412 including a content for notifying that the essential information is omitted and a content to guide the essential information to be input, a UI 1413 guiding for first essential information (e.g., information on time) from among a plurality of essential information to be input, or a UI 1414 guiding for second essential information (e.g., information on a group of persons) from among the plurality of essential information to be input.

The electronic apparatus 100 may obtain the omitted essential information from the user based on the output (or provided) guide information 1410.

According to an embodiment, the guide information may be generated from the electronic apparatus 100. When a signal requesting the essential information is received from the server 200, the electronic apparatus 100 may generate the guide information 1410 for obtaining the requested essential information or the omitted essential information.

According to another embodiment, the guide information may be generated from the server 200. The server 200 may generate, based on the essential information not being included in the combination information obtained from the electronic apparatus 100, the guide information 1410 for obtaining the essential information or the omitted essential information. Then, the server 200 may transmit the guide information 1410 to the electronic apparatus 100.

Figure 15:
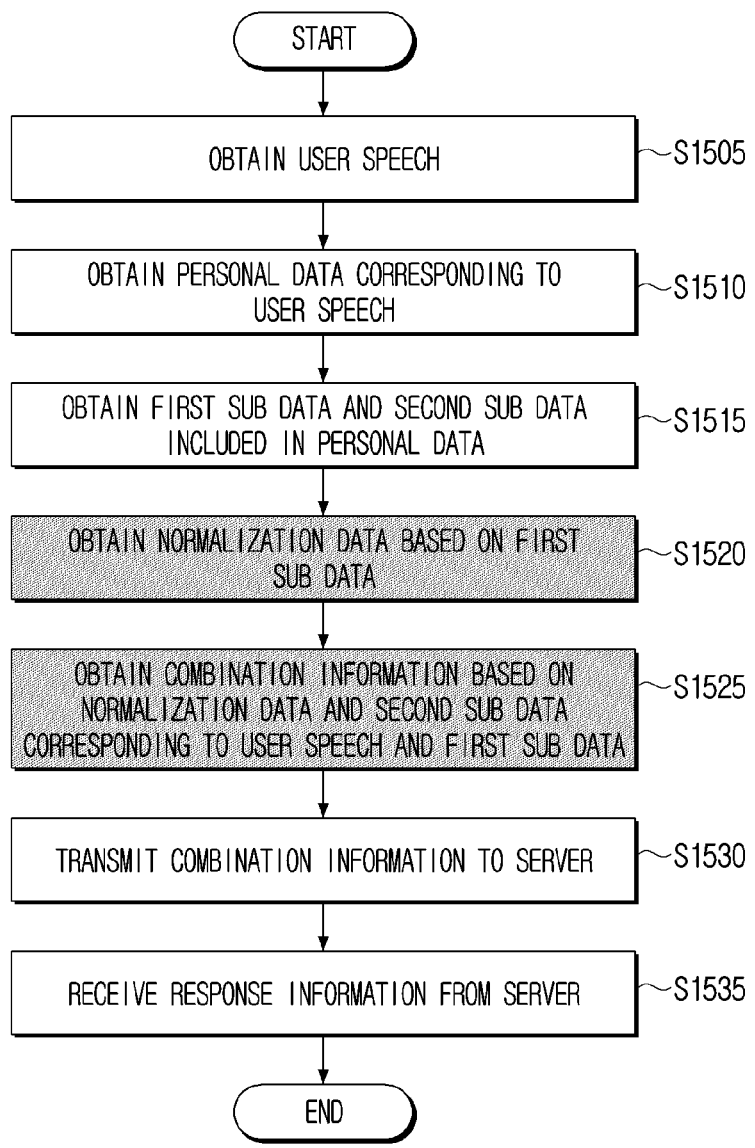
FIG. 15 is a flowchart illustrating an operation of generating combination information by using both first sub data and second sub data according to an embodiment.

FIG. 15 is a flowchart illustrating an operation of generating the combination information by using both first sub data and second sub data according to an embodiment.

Referring to FIG. 15, operations S1505, S1510, and S1515 may correspond to operations S605, S610, and S615 in FIG. 6. Accordingly, redundant descriptions will be omitted. The electronic apparatus 100 may obtain the normalization data based on the first sub data (operation S1520). The normalization data may refer to information in which the first sub data is changed. Specifically, the electronic apparatus 100 may change the first sub data to the normalization data to prevent personal information from being leaked through the first sub data. The normalization data may refer to data which normalized the first sub data based on the predetermined function. The normalization data may refer to data determined as one group from among the predetermined groups.

Then, the electronic apparatus 100 may obtain the combination information based on the normalization data and the second sub data corresponding to the user speech and the first sub data (operation S1525). Then, the electronic apparatus 100 may transmit the combination information to the server 200 (operation S1530).

The server 200 may generate the response information based on the combination information received from the electronic apparatus 100. Then, the server 200 may transmit the response information to the electronic apparatus 100. The electronic apparatus 100 may receive the response information from the server 200 (operation S1535).

Figure 16:
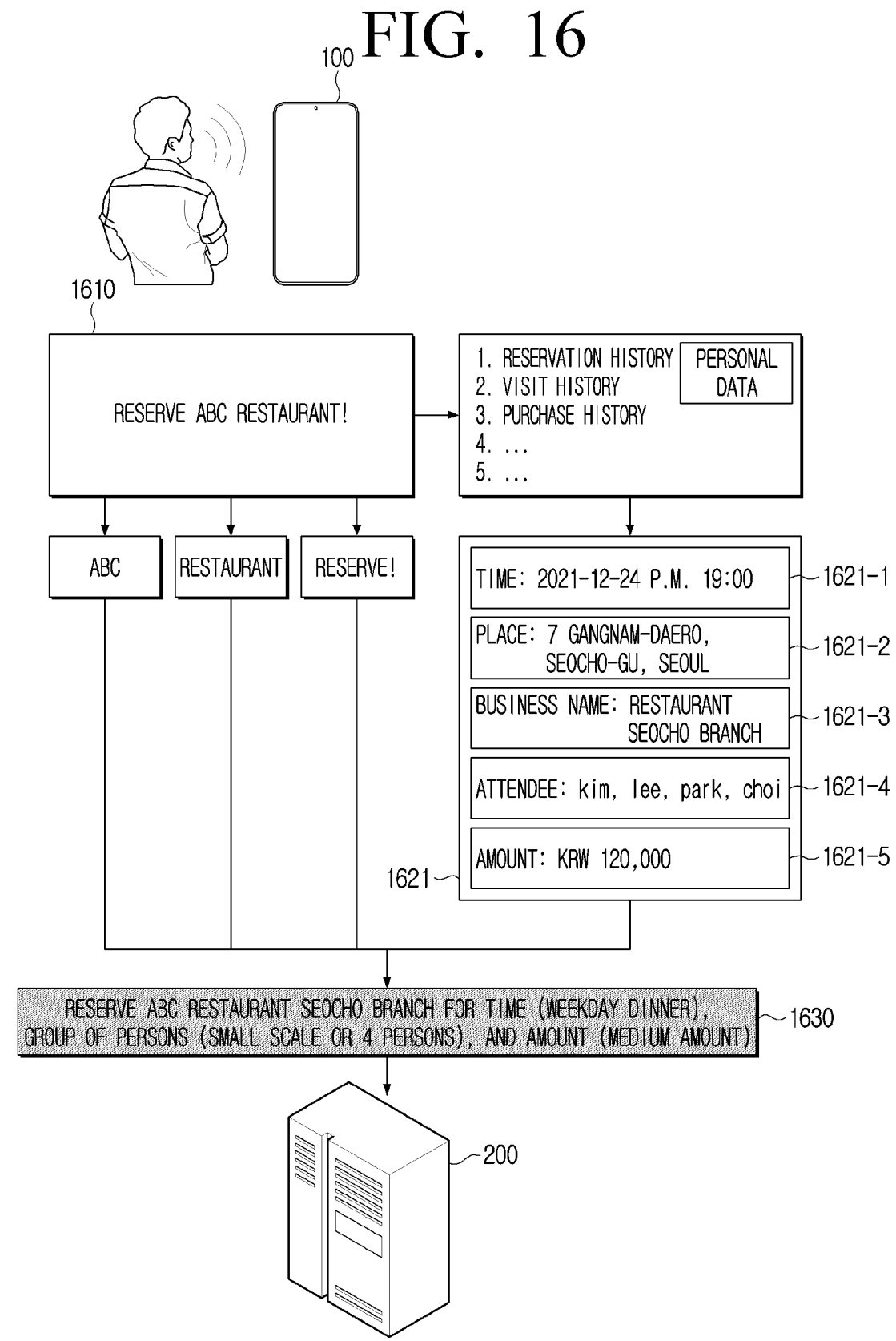
FIG. 16 is a diagram illustrating an operation of generating combination information by using both first sub data and second sub data according to an embodiment.

FIG. 16 is a diagram illustrating an operation of generating the combination information by using both first sub data and second sub data according to an embodiment. The Referring to FIG. 16, the electronic apparatus 100 may identify, based on obtaining a user speech 1610, personal data 1621 corresponding to the user speech 1610 from among the plurality of the personal data. The personal data 1621 may include at least one from among time information 1621-1, place information 1621-2, business name information 1621-3, attendee information 1621-4, or amount information 1621-5

The electronic apparatus 100 may classify the first sub data and the second sub data from the personal data 1621. The first sub data may be data corresponding to the private attribute, and the second sub data may refer to data corresponding to the public attribute. The private attribute may refer to an attribute representing sensitive personal information or information which requires protection. The public attribute may refer to information which is irrelevant even if made public or information which does not require protection. The private attribute or the public attribute may vary according to a setting by the user.

For example, the first sub data may be the time information 1621-1, the attendee information 1621-4, and the amount information 1621-5 from among the personal data 1621. The second sub data may be the place information 1621-2 and the business name information 1621-3.

The electronic apparatus 100 may change the first sub data to the normalization data. Because the time information 1621-1, the attendee information 1621-4, and the amount information 1621-5 correspond to sensitive information, the electronic apparatus 100 may change the corresponding information and transmit to the electronic apparatus 100.

Specifically, the electronic apparatus 100 may use the predetermined function to change the time information 1621-1 to the normalization data (weekday dinner). In addition, the electronic apparatus 100 may change the attendee information 1621-4 to the normalization data (small scale or 4 persons) by using the predetermined function. In addition, the electronic apparatus 100 may change the amount information 1621-5 to the normalization data (medium amount) by using the predetermined function.

The predetermined function may refer to a function which determines input data as one group from among the predetermined plurality of groups. The predetermined plurality of groups will be described in FIG. 17.

The electronic apparatus 100 may obtain combination information 1630 based on the user speech, the normalization data (obtained due to the first sub data), and the second sub data. For example, the combination information 1630 may be "reserve ABC restaurant Seocho branch for time (weekday dinner), group of persons (operation Small scale or 4 persons), and amount (medium amount)."

Then, the electronic apparatus 100 may transmit the combination information 1630 to the server 200.

FIG. 17 is a diagram illustrating group information which is used in obtaining normalization data based on first sub data according to an embodiment.

Referring to FIG. 17, the electronic apparatus 100 may change the first sub data to the normalization data based on the predetermined function.

Table 1710 may include group information which is used to change the time information to the normalization data. If the data included in the time information is 11:00 to 15:00 between Monday-Friday, the electronic apparatus 100 may determine the input data (time information) as a first group (weekday lunch). In addition, if the data included in the time information is 17:00 to 21:00 between Monday-Friday, the electronic apparatus 100 may determine the input data (time information) as a second group (weekday dinner). In addition, if the data included in the time information is 11:00 to 15:00 between Saturday-Sunday, the electronic apparatus 100 may determine the input data (time information) as a third group (weekend lunch). In addition, if the data included in the time information is 17:00 to 21:00 between Saturday-Sunday, the electronic apparatus 100 may determine the input data (time information) as a fourth group (weekend dinner).

Table 1720 may include group information which is used to change the attendee information to the normalization data. If the number of persons included in the attendee information is 1 person, the electronic apparatus 100 may determine the input data (attendee information) as a first group (individual). In addition, if the number of persons included in the attendee information is 2 persons to 4 persons, the electronic apparatus 100 may determine the input data (attendee information) as a second group (small scale). In addition, if the number of persons included in the attendee information is 5 persons or more, the electronic apparatus 100 may determine the input data (attendee information) as a third group (group).

Although the attendee information has been indicated as a group based on the table 1720, the electronic apparatus 100 may obtain the number of persons as the normalization data based on the input data (attendee information). For example, the normalization data may be the number of persons.

Table 1730 may include group information which is used to change the amount information to the normalization data. If the amount included in the amount information is less than KRW 100,000, the electronic apparatus 100 may determine the input data (amount information) as a first group (operation Small amount). In addition, if the amount included in the amount information is greater than or equal to KRW 100,000 and less than KRW 400,000, the electronic apparatus 100 may determine the input data (amount information) as a second group (medium amount). In addition, if the amount included in the amount information is greater than or equal to KRW 400,000, the electronic apparatus 100 may determine the input data (amount information) as a third group (high amount).

Figure 18:
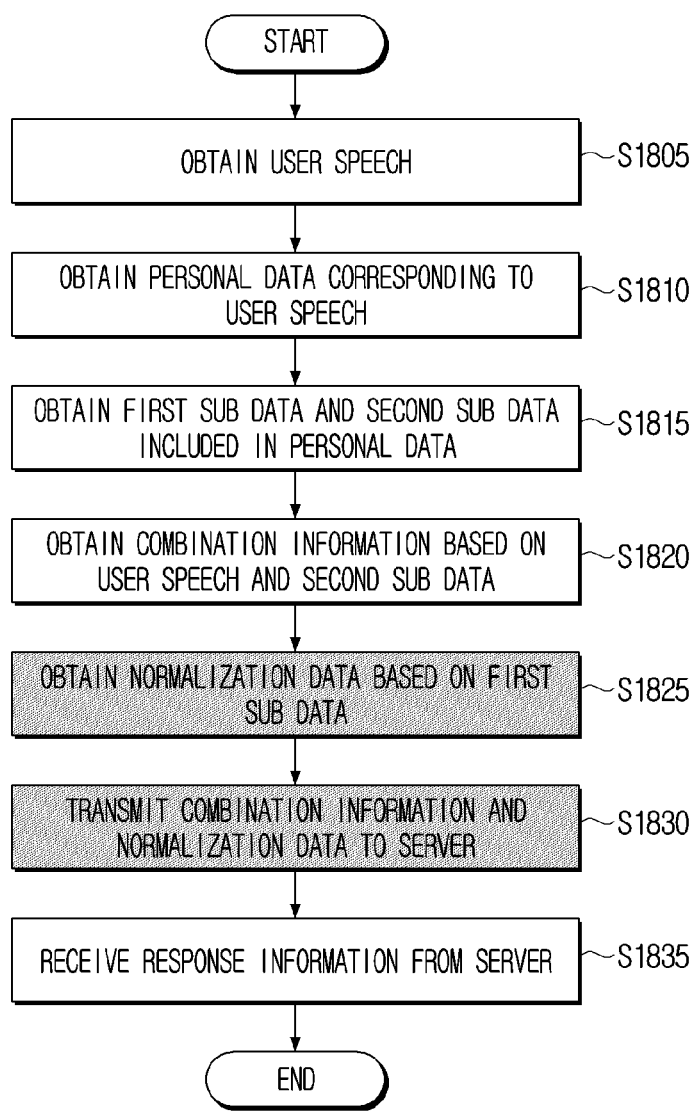
FIG. 18 is a flowchart illustrating an embodiment of normalization data being transmitted to a server separate from combination information according to an embodiment.

FIG. 18 is a flowchart illustrating an embodiment of normalization data being transmitted to the server 200 separate from the combination information according to an embodiment.

Referring to FIG. 18, operations S1805, S1810, S1815, and S1820 may correspond to operations S605, S610, S615, and S620 in FIG. 6. Accordingly, redundant descriptions will be omitted. In FIG. 15 to FIG. 16, an embodiment of the electronic apparatus 100 generating the combination information based on the user speech, the normalization data, and the second sub data has been described. According to another embodiment, the electronic apparatus 100 may generate the combination information without the normalization data, and transmit the normalization data separately to the server 200.

Specifically, the electronic apparatus 100 may obtain the combination information based on the user speech and the second sub data in operation S1820. Then, the electronic apparatus 100 may obtain the normalization data based on the first sub data (operation S1825). Then, the electronic apparatus 100 may transmit the combination information obtained from operation S1820 and the normalization data obtained from operation S1825 to the server 200 (operation S1830).

The server 200 may generate the response information based on the combination information and the normalization data received from the electronic apparatus 100. Then, the server 200 may transmit the response information to the electronic apparatus 100. The electronic apparatus 100 may receive the response information from the server 200 (operation S1835).

Figure 19:
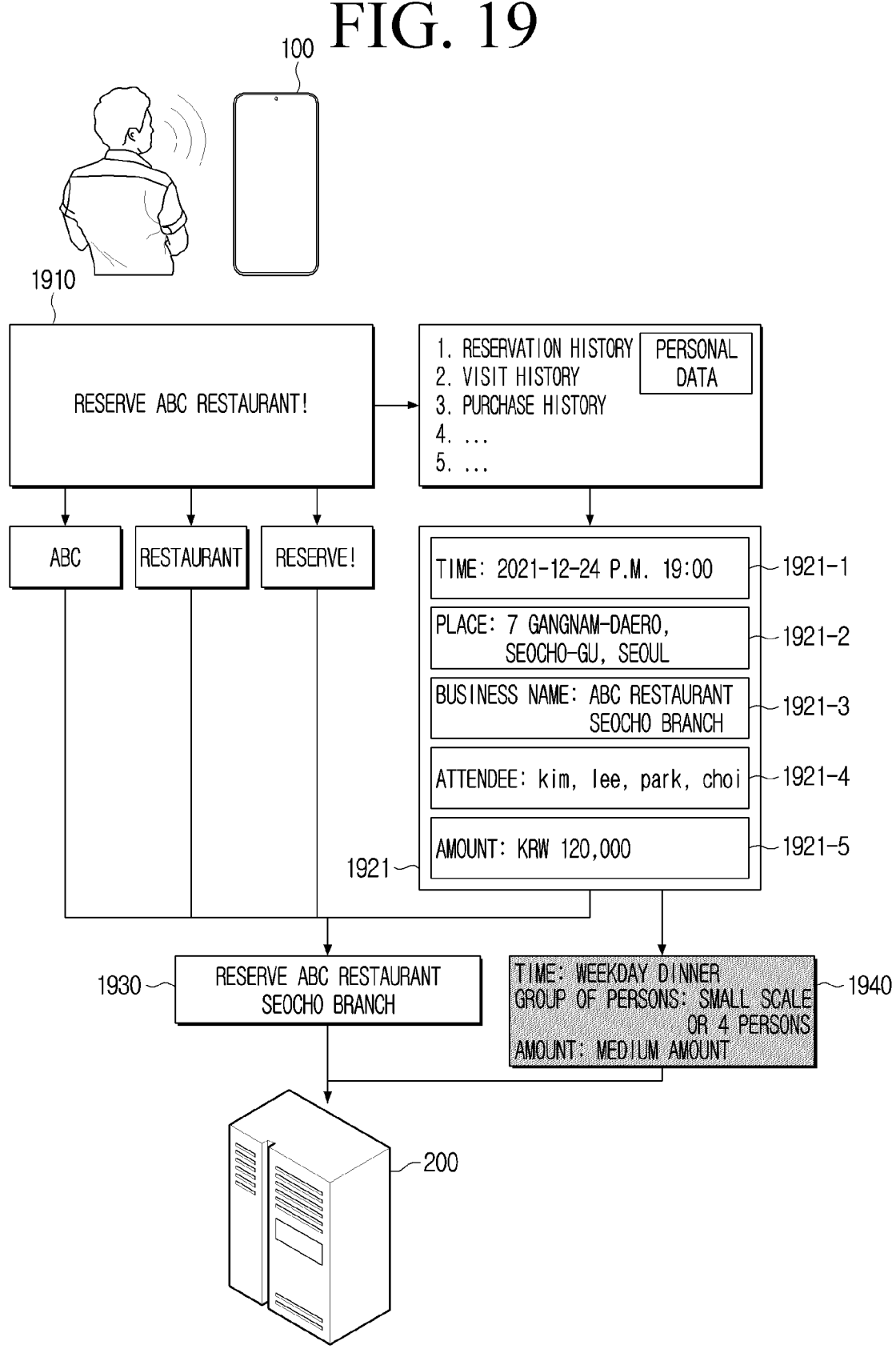
FIG. 19 is a diagram illustrating an embodiment of normalization data being transmitted to a server separate from combination information according to an embodiment.

FIG. 19 is a diagram illustrating an embodiment of normalization data being transmitted to the server 200 separate from the combination information according to an embodiment.

Referring to FIG. 19, the electronic apparatus 100 may identify, based on obtaining a user speech 1910, personal data 1921 corresponding to the user speech 1910 from among the plurality of the personal data. The personal data 1921 may include at least one from among time information 1921-1, place information 1921-2, business name information 1921-3, attendee information 1921-4, or amount information 1921-5.

The electronic apparatus 100 may classify the first sub data and the second sub data from the personal data 1921. The private attribute may refer to an attribute representing sensitive personal information or information which requires protection. The public attribute may refer to information which is irrelevant even if made public or information which does not require protection. The private attribute or the public attribute may vary according to a setting by the user.

For example, the first sub data may be the time information 1921-1, the attendee information 1921-4, and the amount information 1921-5 from among the personal data 1921. The second sub data may be the place information 1921-2 and the business name information 1921-3.

The electronic apparatus 100 may change the first sub data to normalization data 1940. Because the time information 1921-1, the attendee information 1921-4, and the amount information 1921-5 correspond to sensitive information, the electronic apparatus 100 may change the corresponding information and transmit to the electronic apparatus 100.

Specifically, the electronic apparatus 100 may change the time information 1921-1 to the normalization data (weekday dinner) by using the predetermined function. In addition, the electronic apparatus 100 may change the attendee information 1921-4 to the normalization data (small scale or 4 persons) by using the predetermined function. In addition, the electronic apparatus 100 may change the amount information 1921-5 to normalization data (medium amount) by using the predetermined function.

The predetermined function may refer to a function which determines input data as one group from among the predetermined plurality of groups. The predetermined plurality of groups will be described in FIG. 17.

For example, the normalization data 1940 may be "time (weekday dinner), group of persons (small scale or 4 persons), and amount (medium amount)."

The electronic apparatus 100 may obtain combination information 1930 based on the user speech and the second sub data. For example, the combination information 1930 may be "reserve ABC restaurant Seocho branch."

Then, the electronic apparatus 100 may transmit the combination information 1930 to the server 200. Then, the electronic apparatus 100 may transmit the normalization data 1940 to the server 200. Unlike the embodiment in FIG. 16, the electronic apparatus 100 may not use the normalization data 1940 in generating the combination information 1930. Rather, the electronic apparatus 100 may transmit the normalization data 1940 separately to the server 200.

Figure 20:
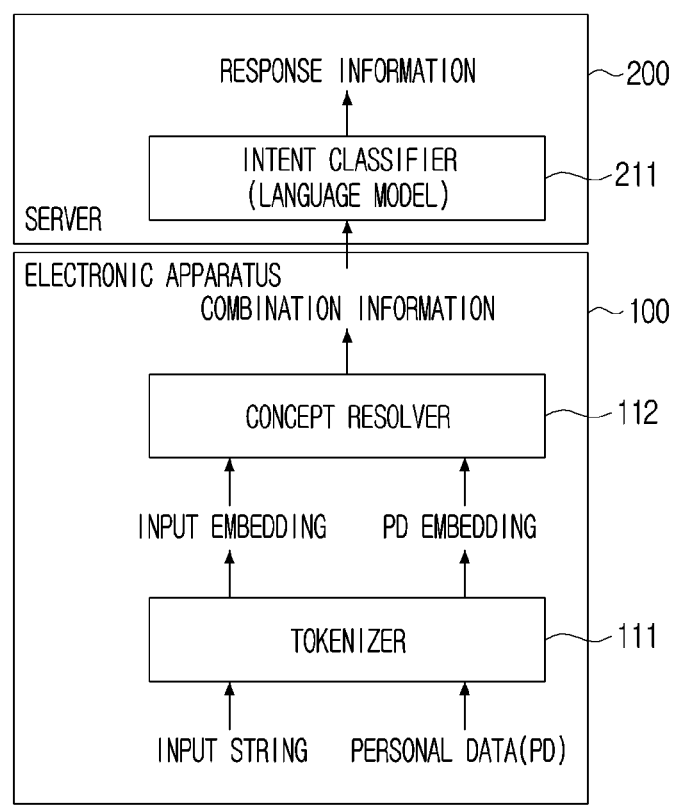
FIG. 20 is a diagram illustrating a module which is included in an electronic apparatus and a sever according to an embodiment.

FIG. 20 is a diagram illustrating a module which is included in the electronic apparatus 100 and the sever 200 according to an embodiment.

Referring to FIG. 20, the electronic apparatus 100 may include a tokenizer 111 and a concept resolver 112.

The tokenizer 111 may divide the input data to a plurality of tokens. A token may be a sentence, a word, or a letter.

The tokenizer 111 may divide the input string (e.g., user speech) obtained as input data to the plurality of sub words (e.g., the first word 1011, the second word 1012, and the third word 1013 in FIG. 10). In addition, the tokenizer 111 may classify the personal data obtained as the input data to a plurality of sub data (e.g., the time information 1021-1, the place information 1021-2, the business name information 1021-3, the attendee information 1021-4, and the amount information 1021-5 in FIG. 10).

The tokenizer 111 may divide the input string and obtain an input embedding. The input embedding may refer to information which represents the plurality of sub words divided from the input string to a vector. The tokenizer 111 may transmit the input embedding corresponding to the input string to the concept resolver 112.

In addition, the tokenizer 111 may divide the personal data and obtain a personal data embedding. The personal data embedding may refer information which represents the plurality of sub data divided from the personal data to a vector. The tokenizer 111 may transit the personal data embedding corresponding to the personal data to the concept resolver 112.

The concept resolver 112 may receive the input embedding and the personal data embedding from the tokenizer 111. Then, the concept resolver 112 may obtain the combination information based on the input embedding and the personal data embedding. The combination information may refer to text information which combined and conceptualized the input string and the personal data. The electronic apparatus 100 may transmit the combination information obtained through the concept resolver 112 and transmit to the server 200.

The server 200 may obtain the combination information from the electronic apparatus 100. Then, the server 200 may transmit the combination information to an intent classifier 211. The intent classifier 211 may obtain the response information (output data) based on the combination information. Then, the server 200 may transmit the response information obtained through the intent classifier 211 back to the electronic apparatus 100.

Figure 21:
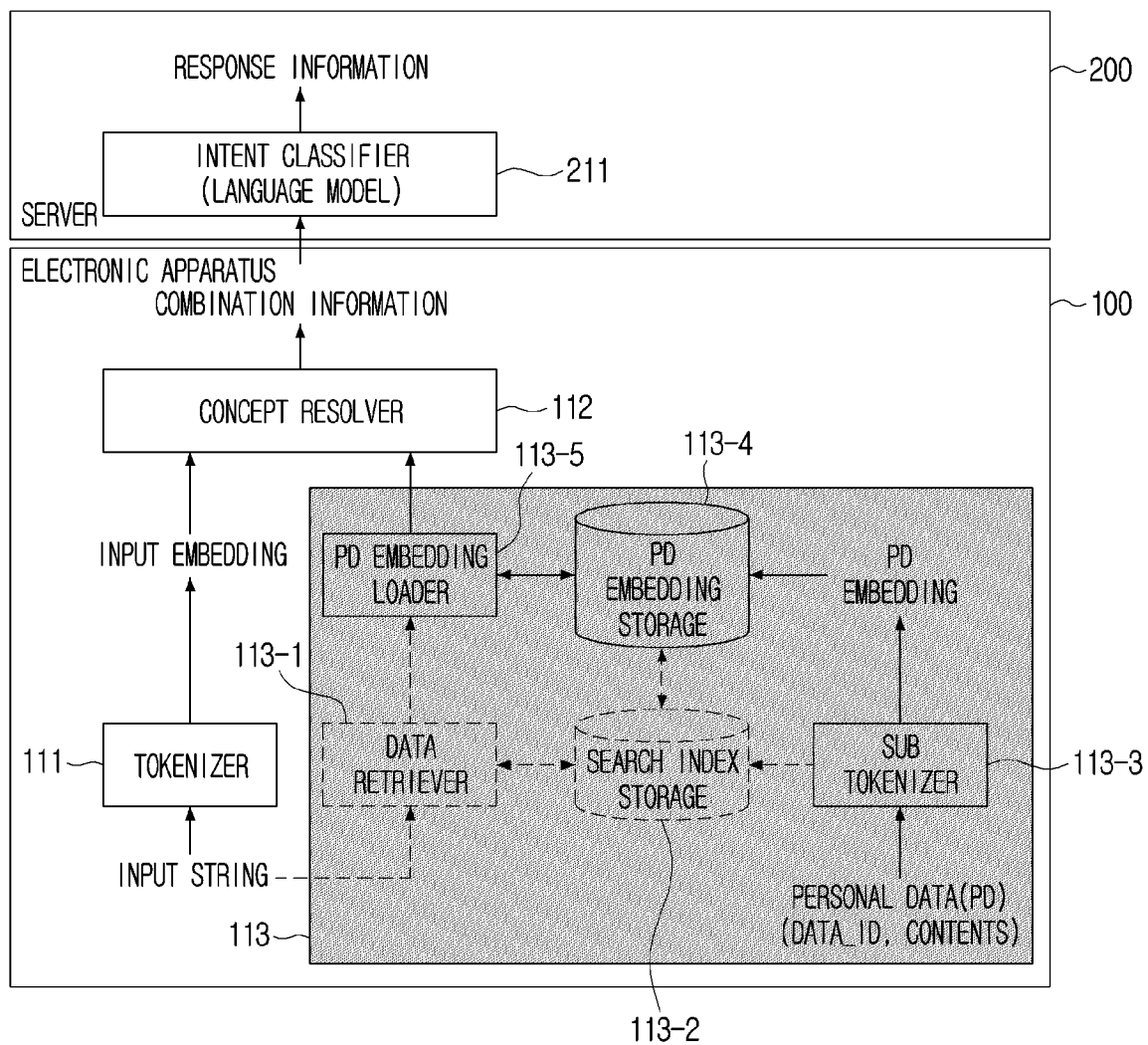
FIG. 21 is a diagram illustrating a detailed personal data analyzing module which is included in an electronic apparatus according to an embodiment.

FIG. 21 is a diagram illustrating a detailed the personal data analyzing module which is included in the electronic apparatus 100 according to an embodiment.

Referring to FIG. 21, because the tokenizer 111, the concept resolver 112, and the intent classifier 211 have been described in FIG. 20, redundant descriptions will be omitted.

In FIG. 21, a detailed operation of using the personal data will be described. The electronic apparatus 100 may include a personal data analyzing module 113. The personal data analyzing module 113 may include at least one from among a data retriever 113-1, a search index storage 113-2, a sub tokenizer 113-3, a personal data embedding storage 113-4, or a personal data embedding loader 113-5.

The data retriever 113-1 may receive the input string. Then, a comparison with a plurality of indexes stored in the search index storage 113-2 may be carried out based on the received input string. Specifically, the electronic apparatus 100 may search a specific index to identify the personal data associated with the input string.

The search index storage 113-2 may store the plurality of indexes. The search index storage 113-2 may receive the plurality of sub data from the sub tokenizer 113-3. Then, the search index storage 113-2 may generate and store an index corresponding to each of the plurality of sub data based on the plurality of sub data. The search index storage 113-2 may share the stored index with the personal data embedding storage 113-4.

The sub tokenizer 113-3 may divide the personal data obtained by the personal data analyzing module 113 to the plurality of sub data. The personal data may refer to data identification information, content, or the like. The sub tokenizer 113-3 may vary with the tokenizer 111. The sub tokenizer 113-3 may divide the personal data, and the tokenizer 111 may divide the input string. The sub tokenizer 113-3 may divide the personal data and transmit the obtained sub data to the search index storage 113-2. In addition, the sub tokenizer 113-3 may obtain the personal data embedding based on the sub data obtained by dividing the personal data. Then, the sub tokenizer 113-3 may transmit the personal data embedding to the personal data embedding storage 113-4.

The personal data embedding storage 113-4 may store the personal data embedding received from the sub tokenizer 113-3. The, the personal data embedding storage 113-4 may receive sharing of the index corresponding to the stored personal data embedding from the search index storage 113-2.

The personal data embedding loader 113-5 may obtain the input string and the index corresponding to the input string from the data retriever 113-1. Then, the personal data embedding loader 113-5 may obtain the personal data embedding corresponding to the input string from among the plurality of the personal data embedding stored in the personal data embedding storage 113-4 based on the index corresponding to the input string. Then, the personal data embedding loader 113-5 may transmit the personal data embedding corresponding to the input string to the concept resolver 112.

According to another embodiment, the personal data may be analyzed without the data retriever 113-1 and the search index storage 113-2. Specifically, the personal data may be stored and called without the index.

The concept resolver 112 may obtain the combination information based on the input embedding obtained from the tokenizer 111 and the personal data embedding obtained from the personal data analyzing module 113. Then, the electronic apparatus 100 may transmit the combination information obtained through the concept resolver 112 to the server 200.

The server 200 may obtain the combination information from the electronic apparatus 100. Then, the server 200 may transmit the combination information to the intent classifier 211. The intent classifier 211 may obtain the response information (output data) based on the combination information. Then, the server 200 may transmit the response information obtained through the intent classifier 211 to back to the electronic apparatus 100.

The personal data analyzing module 113 may update the personal data periodically. Because the personal data is not analyzed in real-time, the electronic apparatus 100 may enhance a response rate for a natural language processing operation, and reduce a load to a system.

Figure 22:
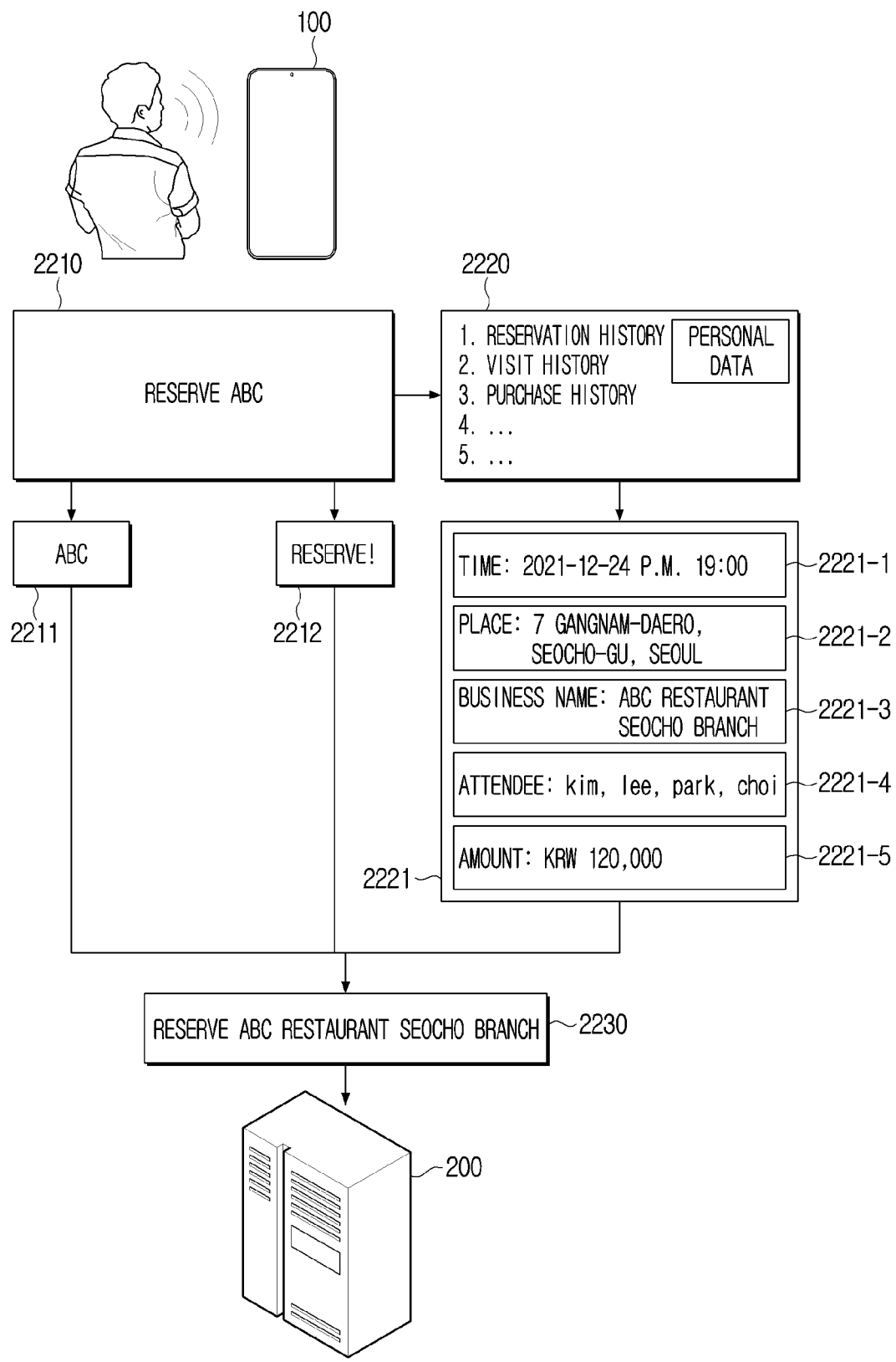
FIG. 22 is a diagram illustrating a personal data using operation according to an embodiment.

FIG. 22 is a diagram illustrating a personal data using operation according to an embodiment according to an embodiment.

Referring to FIG. 22, electronic apparatus 100 may obtain a user speech 2210. It may be assumed that the user speech 2210 is "reserve ABC!"

The electronic apparatus 100 may obtain the plurality of sub words based on the user speech 2210. The plurality of sub words may be obtained. The plurality of sub words may be a first word 2211 and a second word 2212. For example, if the user speech 2210 is "reserve ABC!", the first word 2211 may be "ABC," and the second word 2212 may be "reserve!".

An accurate response information may not be obtained with only the first word 2211 and the second word 2212. This is because it is unclear whether "ABC" may be, for example, a restaurant, a shoe store, or a broadcast channel. Accordingly, the electronic apparatus 100 may use the personal data to clarify "ABC" input by the user.

The electronic apparatus 100 may identify personal data 2221 corresponding to the user speech 2210 from among a plurality of personal data 2220 based on the user speech 2210. The personal data 2221 may include at least one from among time information 2221-1, place information 2221-2, business name information 2221-3, attendee information 2221-4, or amount information 2221-5.

In FIG. 22, the user speech 2210 itself is described as being used to identify the personal data 2221. However, according to an embodiment, the electronic apparatus 100 may identify the personal data 2221 based on the plurality of words 2211 and 2212 which is divided from the user speech 2210.

The electronic apparatus 100 may identify the visit history to "ABC restaurant Seocho branch" by the user based on the personal data 2221. Accordingly, the electronic apparatus 100 may generate combination information 2230 based on the user speech 2210 and the personal data 2221. The combination information 2230 may be "reserve ABC restaurant Seocho branch." Then, the electronic apparatus 100 may transmit the combination information 2230 to the server 200.

Figure 23:
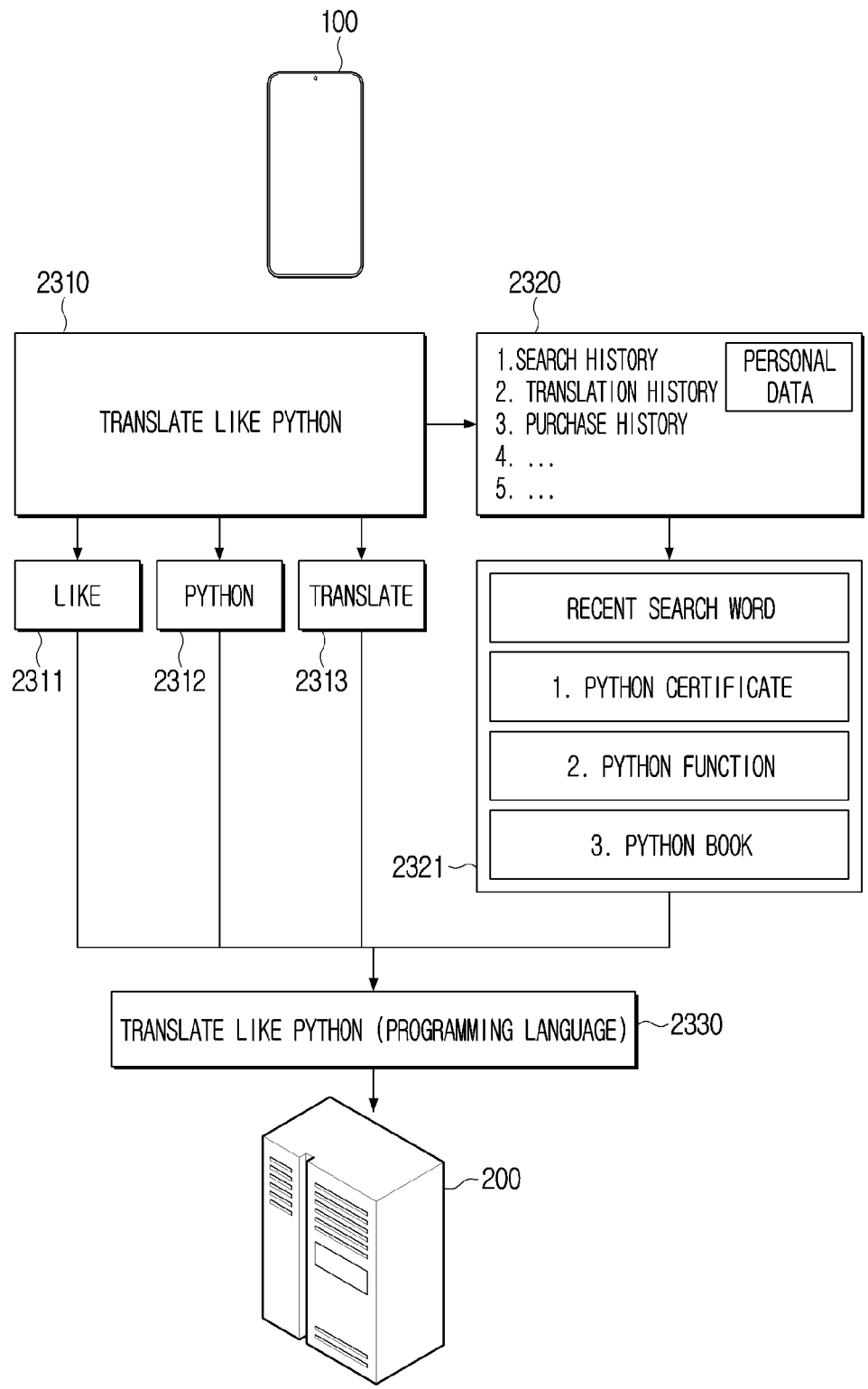
FIG. 23 is a diagram illustrating a personal data using operation according to an embodiment.

FIG. 23 is a diagram illustrating the personal data using operation according to an embodiment.

Referring to FIG. 23, the electronic apparatus 100 may obtain a user speech 2310. It may be assumed that the user speech 2310 is "translate like python."

The electronic apparatus 100 may obtain a plurality of sub words based on the user speech 2310. The plurality of sub words may be obtained. The plurality of sub words may be a first word 2311, a second word 2312, and a third word 2313. For example, if the user speech 2310 is "translate like python," the first word 2311 may be "like," the second word 2312 may be "python," and the third word 2313 may be "translate."

The electronic apparatus 100 may search personal data corresponding to the user speech 2310. The electronic apparatus 100 may store a plurality of personal data 2320 in the memory 110. The plurality of personal data 2320 may include various information associated with the user of the electronic apparatus 100. For example, the plurality of personal data 2320 may include at least one from among a search history, a translation history, or a purchase history.

The electronic apparatus 100 may identify, based on obtaining the user speech 2310, personal data 2321 corresponding to the user speech 2310 from among the plurality of personal data. The personal data 2321 may be a list of recent search words. For example, it may be assumed that the list of recent search words includes python certificate, python function, and python book. The electronic apparatus 100 may identify that the user is interested in python programming based on the personal data 2321 corresponding to the user speech 2310. According to an embodiment, the personal data 2321 may include information that python corresponds to programming language. Although not shown in FIG. 23, python programming language may be included in the list of search words.

In FIG. 23, the user speech 2310 has been described as being used as is to identify the personal data. However, according to an embodiment, the electronic apparatus 100 may identify the personal data 2321 based on a plurality of words 2311, 2312, and 2313 divided from the user speech 2310.

Accordingly, the electronic apparatus 100 may identify that the python means a programming language and not a type of a snake. The electronic apparatus 100 may generate combination information 2330 based on the user speech 2310 and the personal data 2321. The combination information 2330 may be information corresponding to the user speech 2310. For example, the combination information 2330 may be "translate like python (programming language)." Then, the electronic apparatus 100 may transmit the generated combination information 2330 to the server 200.

Figure 24:
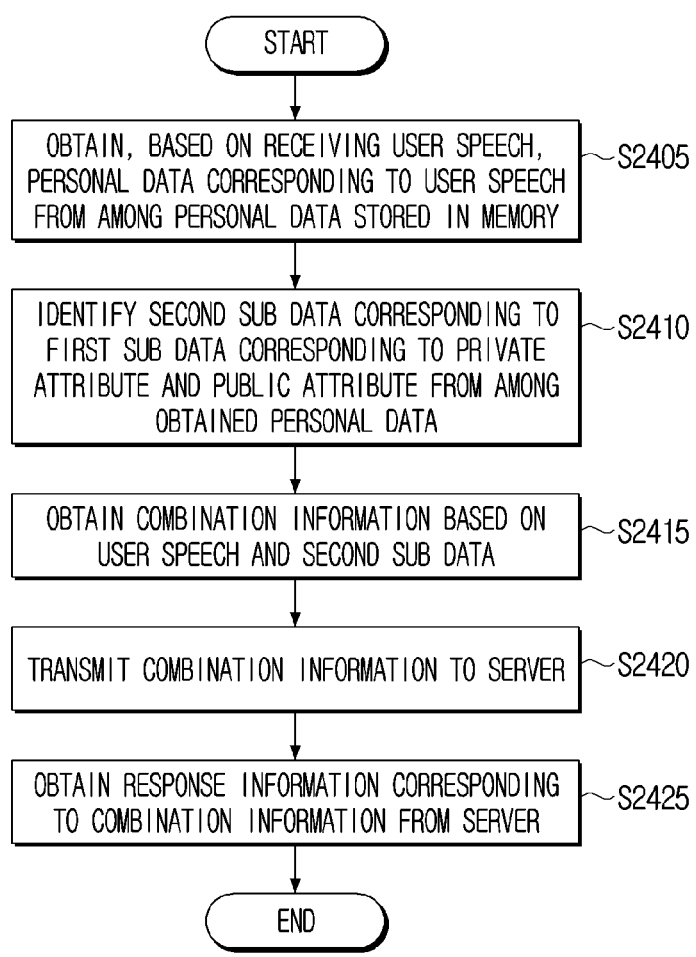
FIG. 24 is a flowchart illustrating a controlling method of an electronic apparatus according to an embodiment.

FIG. 24 is a flowchart illustrating a controlling method of the electronic apparatus 100 according to an embodiment.

Referring to FIG. 24, a controlling method of the electronic apparatus 100 which stores the personal data associated with the user and communications with the server according to an embodiment may include obtaining, based on receiving the user speech, the personal data corresponding to the user speech from among the stored personal data (operation S2405), identifying the first sub data corresponding to the private attribute and the second sub data corresponding to the public attribute from among the obtained personal data (operation S2410), obtaining the combination information based on the user speech and the second sub data (operation S2415), transmitting the combination information to the server (operation S2420), and obtaining the response information corresponding to the combination information from the server (operation S2425).

The obtaining the personal data (operation S2405) may include identifying the plurality of sub words based on the user speech, and obtaining the personal data corresponding to the user speech from among the plurality of the personal data based on the identified plurality of sub words.

The private attribute may be an attribute set by the user so as to not be transmitted to the server.

The controlling method may further include outputting, based on the essential information not being included in the combination information, the first guide information to input the essential information.

The controlling method may further include obtaining the normalization data by normalizing the first sub data with the predetermined function. The obtaining the combination information (operation S2415) may include obtaining the combination information based on the user speech, the second sub data, and the normalization data.

The obtaining the normalization data may include identifying, based on a number being included in the first sub data, a group corresponding to the first sub data from among the predetermined plurality of groups, and obtaining the identified group as the normalization data.

The obtaining the normalization data may include identifying, based on a name being included in the first sub data, the number of persons based on the name included in the first sub data, and obtain the number of persons and the normalization data.

The controlling method may further include outputting, based on the first sub data corresponding to the private attribute being identified from among the personal data, the second guide information to check whether to transmit the first sub data, and the obtaining the combination information (operation S2415) may include obtaining, based on the user input to not transmit the first sub data to the server being received through the second guide information, the combination information based on the user speech and the second sub data.

The outputting the second guide information may include changing, based on the first sub data corresponding to the private attribute being identified from among the personal data, a portion of the text corresponding to the first sub data to the predetermined symbol, and outputting the second guide information which includes the changed first sub data.

The controlling method may further include obtaining the user speech from the microphone of the electronic apparatus 100, displaying, based on the combination information being obtained, the combination information in the display of the electronic apparatus 100, and displaying, based on the response information being obtained, the response information in the display.

The controlling method of the electronic apparatus 100 as in FIG. 24 may be executed on the electronic apparatus having the configurations of FIG. 3 or FIG. 4, and may be executed on even the electronic apparatus having configurations other than that above.

The methods according to the various embodiments of the disclosure described above may be implemented in an application form installable in electronic apparatuses of the related art.

In addition, the methods according to the various embodiments of the disclosure described above may be implemented with only a software upgrade or a hardware upgrade of the electronic apparatuses of the related art.

In addition, the various embodiments of the disclosure described above may be performed through an embedded server provided in an electronic apparatus, or through at least one external server from among the electronic apparatus and the display device.

According to an embodiment of the disclosure, the various embodiments described in the above may be implemented with software including instructions stored in a machine-readable storage media (e.g., computer). The machine may call an instruction stored in the storage medium, and as a device operable according to the called instruction, may include the electronic apparatus according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment of the disclosure, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a server of a manufacturer, a server of an application store, or a storage medium such as a memory of a relay server, or temporarily generated.

In addition, each of the elements (e.g., a module or a program) according to various embodiments described above may be formed as a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the disclosure has been illustrated and described with reference to various example embodiments thereof, it will be understood that the various example embodiments are intended to be illustrative, and not limiting. It will be understood by those skilled in the art that various changes in form and details may be made therein without departing from the true spirit and full scope of the disclosure, including the appended claims and their equivalents.

What is claimed is:

1. An electronic apparatus, comprising:
a memory configured to store personal data associated with a user;
a communication interface configured to communicate with a server; and
a processor configured to:
obtain, from the personal data associated with the user stored in the memory and based on a user speech being received, personal data corresponding to the user speech;
identify, from the personal data corresponding to the user speech, first sub data corresponding to a private attribute and second sub data corresponding to a public attribute;
obtain combination information based on the user speech and the second sub data;
transmit, through the communication interface, the combination information to the server; and
obtain response information corresponding to the combination information from the server,
wherein the private attribute comprises an attribute set by the user so as to be not transmitted to the server, and
wherein the processor is further configured to output, based on essential information not being included in the combination information, first guide information to input the essential information.

2. The electronic apparatus of claim 1, wherein the processor is further configured to identify a plurality of sub words based on the user speech, and
wherein the personal data corresponding to the user speech is obtained based on the identified plurality of sub words.

3. The electronic apparatus of claim 1, wherein the processor is further configured to obtain normalization data by normalizing the first sub data with a predetermined function, and
wherein the combination information is further obtained based on the normalization data.

4. The electronic apparatus of claim 3, wherein the processor is further configured to,
identify, based on a number being included in the first sub data, a group corresponding to the first sub data from among a predetermined plurality of groups, and
obtain the identified group as the normalization data.

5. The electronic apparatus of claim 3, wherein the processor is further configured to,
identify, based on a name being included in the first sub data, a number of persons based on the name included in the first sub data, and
obtain the number of persons as the normalization data.

6. The electronic apparatus of claim 1, further comprising,
a microphone; and
a display,
wherein the processor is further configured to,
obtain the user speech from the microphone,
based on the combination information being obtained, control the display to display the combination information, and
based on the response information being obtained, control the display to display the response information.

7. An electronic apparatus comprising:
memory configured to store personal data associated with a user;
a communication interface configured to communicate with a server; and
a processor configured to:
obtain, from the personal data associated with the user stored in the memory and based on a user speech being received, personal data corresponding to the user speech;

identify, from the personal data corresponding to the user speech, first sub data corresponding to a private attribute and second sub data corresponding to a public attribute;

obtain combination information based on the user speech and the second sub data;

transmit, through the communication interface, the combination information to the server; and obtain response information corresponding to the combination information from the server, wherein the processor is further configured to:

based on the first sub data corresponding to the private attribute being identified, check whether to transmit the first sub data by outputting second guide information, and obtain the combination information based on a user input indicating that the first sub data is not to be transmitted to the server being received through the second guide information.

8. The electronic apparatus of claim 7, wherein the processor is further configured to:

based on the first sub data corresponding to the private attribute being identified from among the personal data, change a portion of a text corresponding to the first sub data to a predetermined symbol, and output the second guide information comprising the changed portion of the text corresponding to the first sub data.

9. A controlling method of an electronic apparatus configured to store personal data associated with a user and to communicate with a server, the controlling method comprising:

obtaining, from the personal data associated with the user and based on a user speech being received, personal data corresponding to the user speech;

identifying, from the personal data corresponding to the user speech, first sub data corresponding to a private attribute and second sub data corresponding to a public attribute;

obtaining combination information based on the user speech and the second sub data;

transmitting the combination information to the server; and obtaining response information corresponding to the combination information from the server, wherein the private attribute comprises an attribute set by the user so as to be not transmitted to the server, and wherein the controlling method further comprises outputting, based on essential information not being included in the combination information, first guide information to input the essential information.

10. The method of claim 9, wherein the obtaining the personal data comprises identifying a plurality of sub words based on the user speech, and wherein the personal data corresponding to the user speech is further obtained based on the identified plurality of sub words.

11. The method of claim 9, wherein the controlling method further comprises obtaining normalization data by normalizing the first sub data with a predetermined function, and wherein the combination information is further obtained based on the normalization data.

\* \* \* \* \*